US012043041B2

(12) United States Patent
Yamasaki

(10) Patent No.: US 12,043,041 B2
(45) Date of Patent: Jul. 23, 2024

(54) PRINTING DEVICE, PRINTING METHOD, AND STORAGE MEDIUM

(71) Applicant: CASIO COMPUTER CO., LTD., Tokyo (JP)

(72) Inventor: Shuichi Yamasaki, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 17/761,551

(22) PCT Filed: Jul. 6, 2020

(86) PCT No.: PCT/JP2020/026317
§ 371 (c)(1),
(2) Date: Mar. 17, 2022

(87) PCT Pub. No.: WO2021/053931
PCT Pub. Date: Mar. 25, 2021

(65) Prior Publication Data

US 2022/0379638 A1 Dec. 1, 2022

(30) Foreign Application Priority Data

Sep. 20, 2019 (JP) ................................ 2019-171860

(51) Int. Cl.
*B41J 25/00* (2006.01)
*B41J 3/407* (2006.01)

(52) U.S. Cl.
CPC ........... *B41J 25/006* (2013.01); *B41J 3/4073* (2013.01)

(58) Field of Classification Search
None
See application file for complete search history.

(56) References Cited

U.S. PATENT DOCUMENTS

2009/0207427 A1* 8/2009 Amano .................. G06K 15/00 358/1.9
2012/0147113 A1* 6/2012 Yamasaki ................ B41J 3/407 347/104

(Continued)

FOREIGN PATENT DOCUMENTS

CN 109203729 A 1/2019
JP 60-239242 A 11/1985

(Continued)

OTHER PUBLICATIONS

International Preliminary Report on Patentability; Application No. PCT/JP2020/026317; dated Mar. 15, 2022.

(Continued)

*Primary Examiner* — Erica S Lin
(74) *Attorney, Agent, or Firm* — Fitch, Even, Tabin & Flannery LLP

(57) ABSTRACT

A printing device including: a print head which performs printing on a printing area in a first nail of a finger or a toe and next performs printing on a printing area in a second nail of a finger or a toe; a mover which moves the print head; and a processor. The processor sets a printing start position in the second nail in response to a printing end position of the printing area in the first nail, the printing start position in the second nail being at a side closer to either a nail tip-side end or a root-side end of the printing area in the second nail, and controls the print head and the mover to perform the printing on the printing area in the second nail from the printing start position in the second nail after the printing is finished for the first nail.

7 Claims, 8 Drawing Sheets

(56) References Cited

U.S. PATENT DOCUMENTS

| | | | | |
|---|---|---|---|---|
| 2012/0287192 | A1* | 11/2012 | Yamasaki | B41J 3/407 347/14 |
| 2013/0038647 | A1* | 2/2013 | Hashimoto | B41J 29/02 347/2 |
| 2015/0235402 | A1* | 8/2015 | Anderson | G06T 15/503 345/641 |
| 2016/0374448 | A1* | 12/2016 | Yamasaki | A45D 29/00 132/200 |

FOREIGN PATENT DOCUMENTS

| | | | |
|---|---|---|---|
| JP | H11-149317 | A | 6/1999 |
| JP | 2002-103720 | A | 4/2002 |
| JP | 2003-534083 | A | 11/2003 |
| JP | 2006-001161 | A | 1/2006 |
| JP | 2011-255013 | A | 12/2011 |
| JP | 2012-135600 | A | 7/2012 |
| JP | 2012-152410 | A | 8/2012 |
| JP | 2017-118897 | A | 7/2017 |
| JP | 2019-111583 | A | 7/2019 |

OTHER PUBLICATIONS

JPO; Application No. 2019-171860; Notice of Reasons for Refusal dated Jun. 13, 2023.

JPO; Application No. 2019-171860; Notice of Reasons for Refusal dated Nov. 21, 2023.

* cited by examiner

FIG.13
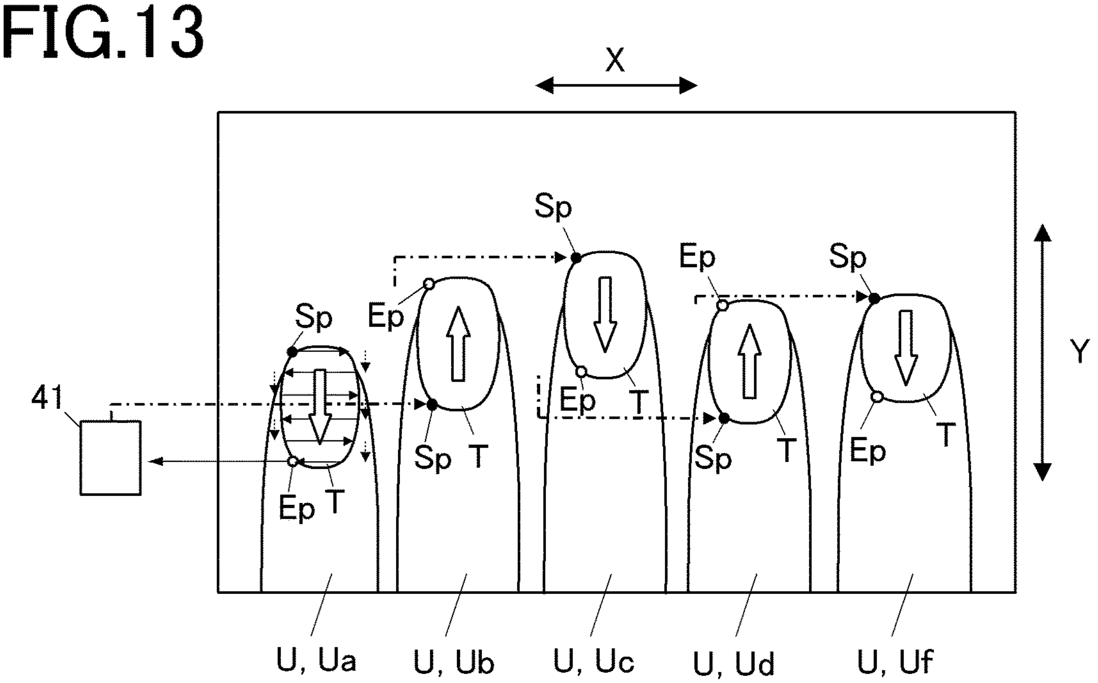
FIG.14
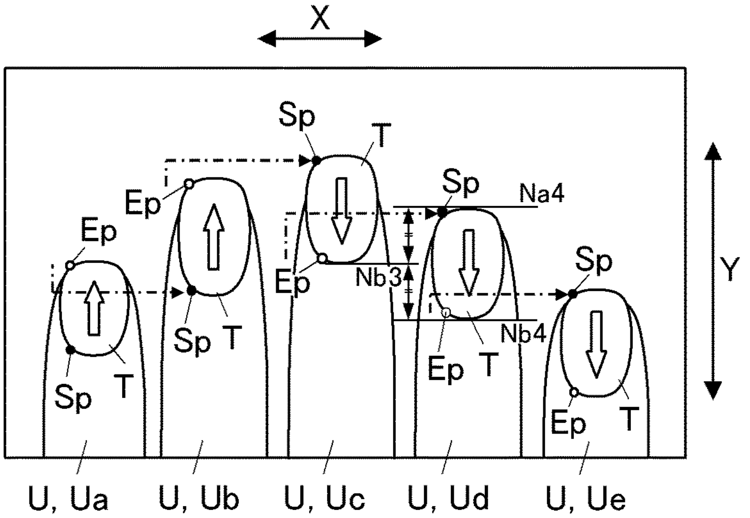
FIG.15
| | LITTLE FINGER | RING FINGER | MIDDLE FINGER | INDEX FINGER |
|---|---|---|---|---|
| LEFT HAND TYPE 1 | UP | UP | DOWN | DOWN |
| LEFT HAND TYPE 2 | UP | UP | DOWN | UP |
| ⋮ | ⋮ | ⋮ | ⋮ | ⋮ |

PRINTING DEVICE, PRINTING METHOD, AND STORAGE MEDIUM

CROSS-REFERENCE TO RELATED APPLICATIONS

This application is a U.S. national phase application filed under 35 U.S.C. § 371 of International Application No. PCT/JP2020/026317, filed Jul. 6, 2020, which is based upon and claims the benefit of priority from the prior Japanese Application No 2019-171860, filed Sep. 20, 2019.

FIELD OF THE INVENTION

The present invention relates to a printing device, a printing method, and a program.

BACKGROUND OF THE INVENTION

Conventionally, printing devices (nail printing devices) have been known to print nail designs on fingernails etc.

For example, JP 2003-534083A discloses a device that is configured to allow the fingers of both hands to be set in the device at the same time.

When printing on a single fingernail, for example, the print head performs the reciprocating operation of performing printing while moving in the nail width direction (main scanning direction), and after printing to the side edge of the nail, moving a predetermined amount in the extending direction of the nail (sub-scanning direction orthogonal to the main scanning direction), for example, to the lower side, and then performing printing while moving back along the main scanning direction again.

SUMMARY OF INVENTION

However, if multiple fingers can be set at the same time as in the device described in JP 2003-534083A, the nail positions of respective fingers are not a continuous area but the printing areas for the number of nails scatter around, unlike the case where paper is the print medium. Therefore, nail printing is done sequentially for each nail.

At this time, if the movement in the sub-scanning direction orthogonal to the movement direction (main scanning direction) of the print head during printing is fixed to a certain direction, such as the direction from the nail tip to the root of nail, for example, after printing is completed for one nail, in order to start printing the next nail, the print head has to move to a specified printing start position, such as the nail tip position of the next nail.

Thus, there has been a problem that the travel distance of the print head becomes unnecessarily long and inefficient, and the time required for printing increases as a result.

The present invention has been made in consideration of the above problems, and an object of the present invention is to provide a printing device, a printing method, and a program that can efficiently print on multiple nails in a printing device that can set multiple fingers at the same time.

A printing device of the present invention is a printing device including:

- a print head which performs printing on a printing area in a first nail of a finger or a toe and next performs printing on a printing area in a second nail of a finger or a toe;
- a moving mechanism which moves the print head; and
- a printing controller that controls the print head and the moving mechanism to perform printing from a printing start position of the printing area in the first nail while moving in a main scanning direction, and, after the printing is finished for the first nail, start the printing on the printing area in the second nail from a printing start position that is set at an end among a nail tip-side end and a root-side end of the printing area in the second nail, the end being on a side closer to a printing end position of the printing area in the first nail.

The present invention has an effect of enabling printing to be performed efficiently on multiple nails in a printing device that can set multiple fingers at the same time.

BRIEF DESCRIPTION OF DRAWINGS

FIG. 13 is an explanation view showing an example of the sub-scanning direction when printing for multiple printing fingers.

FIG. 14 is an explanation view showing an example of the sub-scanning direction when printing for multiple printing fingers.

FIG. 15 is a view showing an example of a table that specifies the printing direction when printing for multiple printing fingers.

DESCRIPTION OF EMBODIMENTS

Hereinafter, an embodiment of a printing device and a printing method according to the present invention will be described with reference to FIG. 1 to FIG. 13.

The embodiments described below have various limitations which are technically preferable for carrying out the present invention, but the scope of the present invention is not limited to the following embodiments and illustrated examples.

In the following embodiment, there is described, as an example, a case where the printing device is a nail printing device which performs printing on a fingernail of a hand as a printing target. However, the printing target of the printing device in the present invention is not limited to a fingernail of a hand, and for example, a nail of a toe may be used as a printing target. In addition, the printing target may be objects other than nails, such as nail tips and the surfaces of various accessories.

Figure 1:
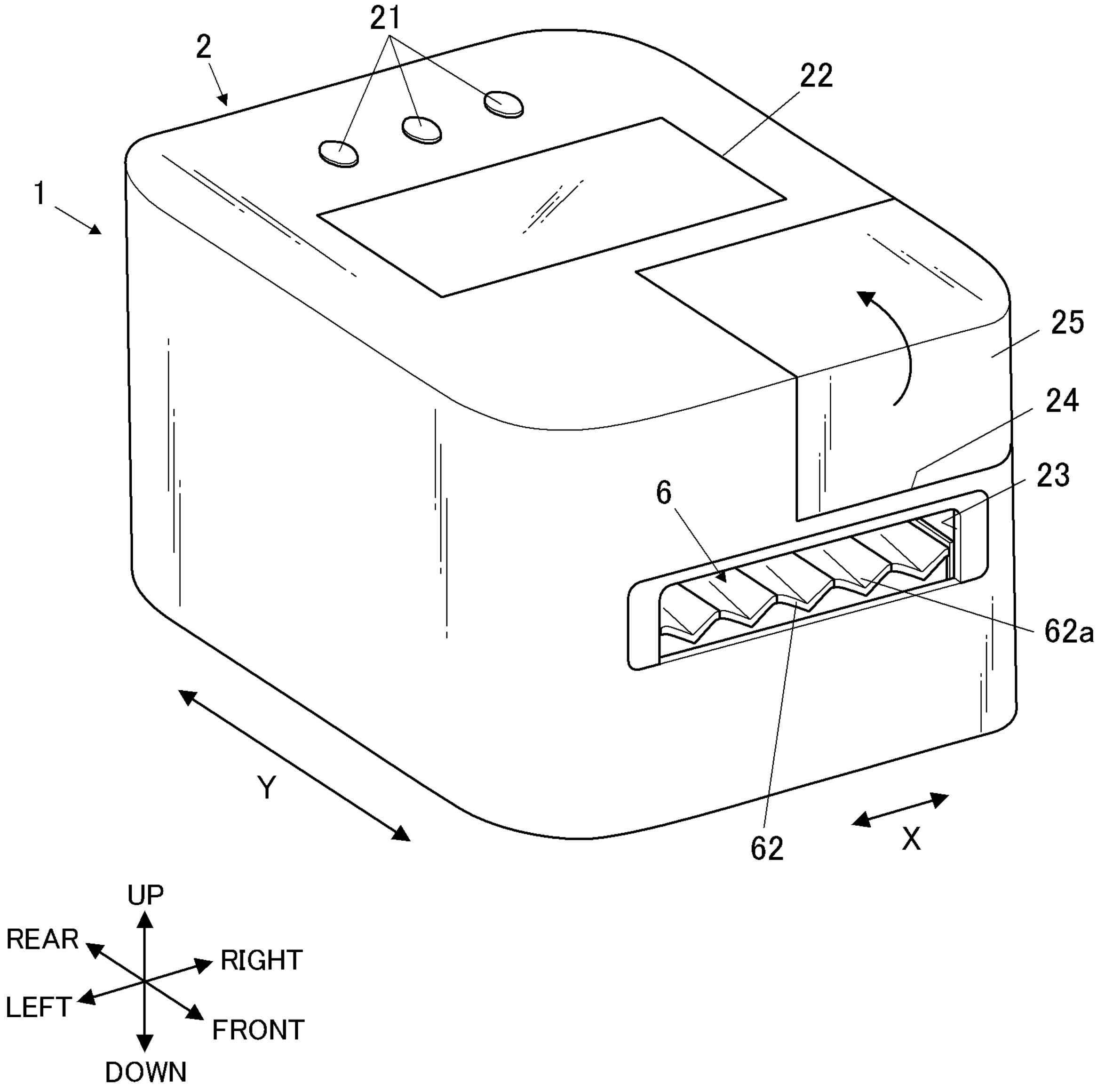
FIG. 1 is a perspective view showing an external configuration of a nail printing device according to an embodiment.

FIG. 1 is a perspective view showing an external configuration of a nail printing device that is a printing device in the embodiment.

In the following embodiment, the up and down, the left and right, and the front and rear are referred to as those shown in FIG. 1. The X-axis direction and Y-axis direction are referred to as those shown in FIG. 1.

The nail printing device 1 in the present embodiment includes a housing 2 which is formed in a substantially box shape, as shown in FIG. 1.

An operation unit 21 is set on the upper surface (top plate) of the housing 2.

The operation unit 21 is an operation unit for the user to perform various types of input.

Operation buttons for performing various types of input such as a power switch button to turn on the nail printing device 1, a stop switch button to stop the operation, and a printing start button to instruct to start printing are arranged as the operation unit 21, for example.

When the operation unit 21 is operated, an operation signal is output to a control device 30, and the control device 30 performs control according to the operation signal, to operate the components of the nail printing device 1.

If a display 22 described below is equipped with a touch panel type input section, the operation unit 21 may include the touch panel type input section.

A display 22 is provided on the upper surface (top plate) of the housing 2.

The display 22 is configured by including a liquid crystal display (LCD), an organic electroluminescence display or other flat displays, for example.

A touch panel may be integrally formed with the surface of the display 22 in the embodiment. In this case, the touch panel is configured to allow the user to make various inputs by touching the surface of the display 22 with a fingertip or a special pen not shown in the drawings, and the touch panel type input section functions as the operation unit 21.

In the embodiment, the display 22 includes, for example, a nail image obtained by photographing a printing finger U (see FIG. 3) (i.e., an image of the printing finger U including an image of the nail T), an image of the outline shape of the nail T included in the nail image and the range to be printed (printing area), a design selection screen for selecting a nail design to be printed on the printing area of the nail T, a thumbnail image for confirming the design, an instruction screen for displaying various instructions, a notification screen, a warning screen, etc. are displayed as appropriate.

In addition, on the front side of the housing 2 (the front side in FIG. 1) and approximately in the center of the X-axis direction of the device (the X direction in FIG. 1, the left-right direction of the nail printing device 1), a finger insertion port 23 is formed. The finger insertion port 23 is an opening for inserting a finger during printing with the nail printing device 1. The finger insertion port 23 is provided at a position corresponding to the finger stage 6 described below. In the embodiment, it is possible to place a maximum of five fingers (that is, all the fingers of one hand) on the finger stage 6, and the finger insertion port 23 is formed to a width (length in the X-axis direction) and height sufficient to allow the entire one hand to be inserted into the device.

The size, etc. of the finger insertion port 23 is not limited to this, but is set according to the number of fingers that can be inserted into the device at a time. If, for example, only up to four fingers are assumed to be inserted at a time (e.g., four fingers of one hand excluding the thumb), then the finger insertion port 23 is formed to be wide and high enough to allow the insertion of four fingers. For example, if 10 fingers are assumed to be inserted at a time (i.e., 10 fingers of both hands), then the finger insertion port 23 is formed to be wide and high enough to allow insertion of all fingers of both hands at once.

In addition, an opening 24 is provided in a part of the housing 2 where the print head 41 can be replaced. The opening 24 is provided with a lid 25 that can be opened and closed by a hinge or the like not shown in the drawings. When the lid 25 is closed, the opening 24 is blocked to prevent dust, etc., from entering the inside of the device.

The opening 24 allows users to access the inside of the device from outside the device when the lid 25 is open.

The lid 25, which closes the opening 24, may be manually opened and closed by the user, or may be configured to open and close automatically by pressing a button or other device not shown in the drawings.

The position where the opening 24 is provided is the position where the print head 41 of the printing unit 40 described below can be moved to the corresponding position. In the embodiment, the opening 24 is formed on the upper right side of the device, as shown in FIG. 1. The position and size of the opening 24 can be set appropriately.

In other words, the print head 41 of the embodiment is configured so that it can be detached from the carriage 42 and replaced, and the opening 24 is formed at a position and size that allow the smooth attachment and detachment of the print head 41 and its removal from the device.

The device main body, which is not shown in the drawings, is housed inside the housing 2.

The device main body is configured by various components assembled on a base.

On the base and at the front side of the device, a finger stage 6 is provided at a position corresponding to the aforementioned finger insertion port 23 to place the printing finger U inserted through the finger insertion port 23. Here, the printing finger U is the finger corresponding to the nail T to be printed by the printing unit 40.

On the lower side of the finger stage 6, a placing member 62 is provided to place the belly part of the printing finger U inserted in the finger stage 6.

The placing member 62 supports the printing finger U from below in the finger stage 6, and is made of, for example, a flexible resin.

Figure 3:
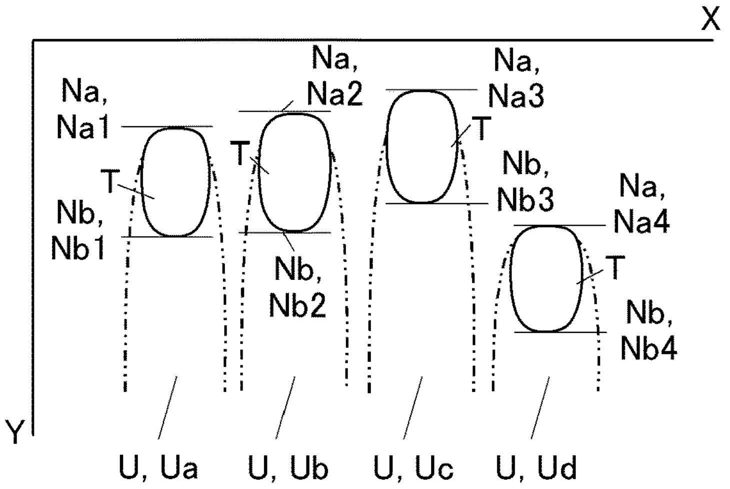
FIG. 3 is an explanation view showing the position coordinates of the Y-axis ends of the various printing fingers.

The placing member 62 of the embodiment has a depression *62a* that is depressed along the Y-axis according to the number of fingers that can be inserted into the finger stage 6 (see FIG. 1, illustration is omitted in FIG. 3 and other figures).

FIG. 1 illustrates a case where five printing fingers U can be inserted through the finger insertion port 23, and a depression *62a* for five fingers is provided.

As a result, when the printing fingers U are placed on the placing member 62, the depression *62a* receives the belly portions of the printing fingers U and prevents each printing finger U from rattling in the left-right direction. In addition, it is easy to separate and place each printing finger U one by one, and each printing finger U can be easily positioned.

The placing member 62 may be configured to move up and down, in which case the height of the placing member 62 can be adjusted according to the thickness of the printing finger U, etc.

The back side of the finger stage 6 on the top surface is open so that the nail T of the printing finger U inserted in the finger stage 6 can be exposed through this opening. In the embodiment, printing is performed by the printing unit 40 described below in the open area.

Figure 2:
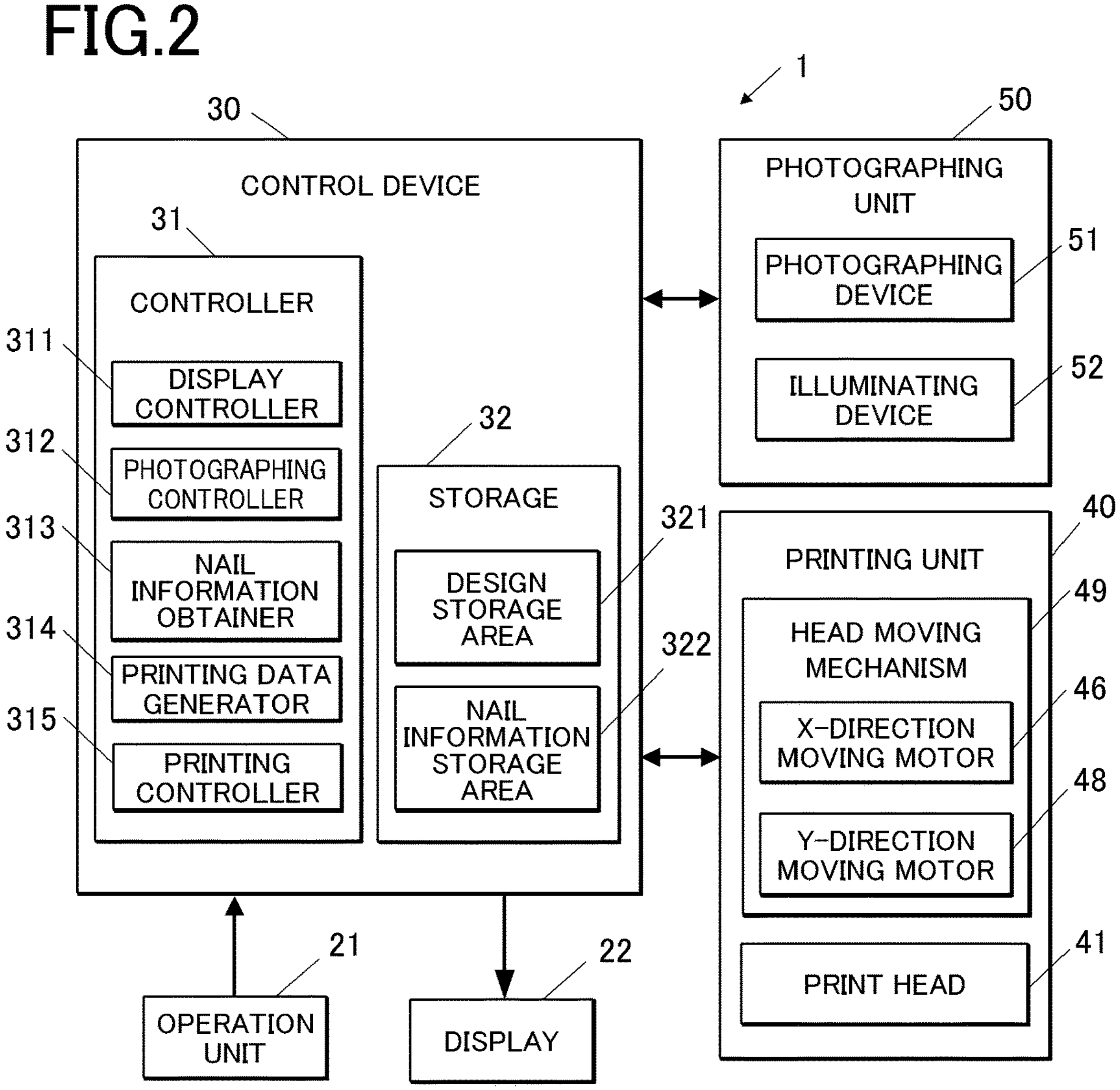
FIG. 2 is a main part block diagram showing the control configuration of the nail printing device in the embodiment.

The printing unit 40 that performs printing on the nail T (surface of the nail T) of the printing finger U, the photographing unit 50 that obtains photographed images (nail image including the nail T) of the printing finger U including the nail T, and the like are provided inside the device main body (see FIG. 2).

The printing unit 40 prints on a "printing area", and includes a print head 41 supported by a carriage not shown or the like, a head moving mechanism 49 (see FIG. 2) for moving the print head 41 in the X-axis direction (X-axis direction in FIG. 1, left-right direction of the nail printing device 1) and Y-axis direction (Y-axis direction in FIG. 1, depth direction of the nail printing device 1, front-rear direction).

The head moving mechanism 49 consists of an X-direction moving motor 46, a Y-direction moving motor 48, etc. as a drive unit for moving the print head 41 in the X and Y directions as appropriate.

The printing unit 40 is connected to the printing controller 315 (see FIG. 2) of the control device 30 described below, and is controlled by the printing controller 315.

In the embodiment, the "printing area" is the area set on the surface of the nail T of the printing finger U, and is all or part of the area of the nail T. In other words, the "printing area" is the area where printing is planned to be performed in the area of nail T of the printing finger U. When printing nail print on the entire surface of nail T, the "printing area" is set to the entire surface of nail T and matches the outline of nail T. On the other hand, when a nail print is to be printed on a part of nail T, such as a French nail or a one-point design, for example, the "printing area" is set to a part of the area of nail T and does not match the outline of nail T.

In the embodiment, the printing unit 40 prints sequentially in the "printing area" for each nail T of multiple printing fingers U. FIG. 3, etc. illustrate the case where the nail print is performed on the entire surface of nail T (the case where the "printing area" matches the outline of nail T).

In the embodiment, while moving above the nail T (i.e., above the nail surface) of the printing finger U held in the finger stage 6, the print head 41 prints a nail design based on printing data on the surface of nail T (range that is recognized and set as the "printing area" by a nail information obtainer 313 described below).

The print head 41 in the embodiment has the surface facing the surface of nail T as an ink ejection surface including multiple nozzle openings to eject ink (none of them shown in the drawings). The print head 41 is an inkjet type head that performs printing by making micro droplets of ink and directly spraying, from the ink ejection surface, the ink onto the surface of nail T.

The print head 41 is a cartridge integrated type having inks of respective colors therein, and can eject inks of Y (YELLOW), M (MAGENTA), and C (CYAN), for example. The ink which can be ejected by the print head 41 is not limited to them. For example, the print head 41 may also include the ink of black (K), and be able to eject the ink of black (K). The configuration and the like of the print head 41 are also not limited to those shown in the embodiment. For example, the print head 41 may be configured by other than the inkjet type. The print head 41 may be configured separate from the cartridge.

The photographing unit 50 (see FIG. 2) includes a photographing device 51 and an illuminating device 52.

The photographing device 51 is, for example, a small-sized camera configured by including a solid imaging element which has approximately two million pixels or more and a lens (none of them shown in the drawings). The illuminating device 52 is an illuminating lamp of a white LED, for example.

The photographing unit 50 illuminates the nail T of the printing finger U placed on the finger stage 6 with the illuminating device 52. The photographing unit 50 photographs the area corresponding to the nail T of the printing finger U with the photographing device 51, and obtains the nail image (image of the printing finger U including the image of nail T).

The photographing unit 50 is connected to an after-mentioned photographing controller 312 (see FIG. 2) of the control device 30 and controlled by the photographing controller 312.

The image photographed by the photographing unit 50 may be stored in an after-mentioned storage 32.

FIG. 2 is a block diagram showing the main parts of the control configuration of the nail printing device in the embodiment.

As shown in FIG. 2, the nail printing device 1 includes the control device 30.

The control device 30 is a computer that includes: a controller 31 configured by including a processor(s) such as a CPU (Central Processing Unit) not shown in the drawings; and a storage 32 configured by including a ROM (Read Only Memory), a RAM (Random Access Memory) (none of them shown in the drawings), and the like.

The control device 30 is set on a substrate or the like (not shown in the drawings) placed on the lower surface side of the top plate of the housing 2, for example.

The storage 32 stores various types of programs and data not shown in the drawings to operate the nail printing device 1 and the like.

To be specific, for example, the storage 32 stores in the ROM various programs such as a printing program for performing printing processing, and the controller 31 reads out these programs, loads them to the working area of RAM, and execute them, to integrally control the components of the nail printing device 1.

The storage 32 in the embodiment includes a design storage area 321 that stores nail design data, a nail information storage area 322 that stores the nail image data obtained by the photographing unit 50, and various data obtained by analyzing the nail image by an after-mentioned nail information obtainer 313. The data that the nail information obtainer 313 obtains by analyzing the nail image includes, for example, the outline of the area of nail T (coordinates indicating the outline shape of nail T, etc.), coordinates indicating the range of the printing area (the area where the nail design is printed according to the printing data) included in the area of nail T, the curvature of nail T (data indicating the degree of curvature), etc. The data stored in the storage 32 is not limited to those shown in the embodiment.

In a functional view, the controller 31 includes a display controller 311, a photographing controller 312, a nail information obtainer 313, a printing data generator 314, a printing controller 315, and the like. The functions as the display controller 311, photographing controller 312, nail information obtainer 313, printing data generator 314, printing controller 315, and the like are realized by cooperation between the CPU of the controller 31 and the programs stored in the ROM of the storage 32.

The display controller 311 controls the display 22 to display various types of display screens on the display 22.

For example, the display controller 311 controls the display 22 to display a design selection screen urging the user to select the nail design to be printed on the nail T. When nail designs are displayed on the design selection screen, the nail designs may be those stored in storage 32 or obtained from an external terminal device or a server device that provides cloud computing services, for example. It is preferable that the display controller 311 displays nail designs on the display 22 in sequence or in a list on the design selection screen.

In addition, the display controller 311 may cause the display 22 to display an image of the nail T with the nail design selected by the user superimposed on it, so that the user can check the finished image before the actual printing starts, and can re-select the nail design if the user does not like the nail design.

The display controller 311 may cause the display 22 to display various messages and instructions to the user.

The photographing controller 312 controls the photographing device 51 and the illuminating device 52 of the photographing unit 50, and controls the photographing device 51 to photograph a printing finger U placed on the finger stage 6 to obtain the nail image including the image of nail T.

The data of the nail image obtained by the photographing unit 50 may be stored in the storage 32.

The nail information obtainer 313 identifies the printing area of nail T based on the area (outline shape) of nail T of the printing finger U and information for identifying the printing area included in the area of nail T.

In the embodiment, the "information for identifying the printing area" is the nail image obtained by the photographing unit 50. The nail information obtainer 313 functions as a nail outline obtainer that obtains the coordinates of the outline that defines the area (outline shape) of the nail T and the coordinates of the outline that defines the printing area by analyzing the nail image, etc.

The nail image of the nail T of the printing finger U (the second nail) to be printed next to the first nail (e.g., the nail T of the printing finger U that is printed first) is preferably obtained after the printing is finished for the first nail and before the printing on the printing area in the second nail starts. In this way, even if a printing finger U other than the one corresponding to the nail T to be printed next moves within the finger stage 6, it will not affect the acquisition of the outline shape of the nail T or the subsequent printing.

In this embodiment, the nail information obtainer 313 also functions as a coordinate obtainer to obtain the coordinate Na (see FIG. 3), which is the position in the Y-axis direction (in the length direction of the nail T) of the tip-side end of the nail, and the coordinate Nb (see FIG. 3), which is the position in the Y-axis direction (in the length direction of the nail T) of the root-side end of the nail T among the coordinates defining the printing area of nail T.

From the outline shape of the nail T, the nail tip-side end and root-side end of the printing area are identified for the nail T of each printing finger U (second nail, etc.).

The specific method by which the nail information obtainer 313 detects the printing area is not particularly limited. For example, the nail image obtained by photographing the nail T with a base coat of a different color from the nail T and finger (printing finger U) is analyzed to detect the area where the base coat is applied and the detected area is set as the printing area.

In other words, when the nail T is unpainted, it is difficult to distinguish it from the color of the surrounding skin, such as fingers. For this reason, the embodiment applies a base coat of a white color or white ink to the surface of the nail T in advance, and the nail information obtainer 313 analyzes the brightness, lightness, tint, etc. of the nail image to distinguish between the part with the base coat, etc. and the other part. Then, the nail information obtainer 313 detects the area where the base coat or the like is applied as the printing area (i.e., the range to be printed).

FIG. 3 illustrates the coordinate Na of nail tip-side end and the coordinate Nb of root-side end of nail in each printing area when placing, on the XY coordinate, the outline of the printing area of nail T (coinciding with the area of nail T in the example shown in the figure) for each finger (printing fingers Ua to Ud) in the case where multiple fingers are placed on the finger stage 6.

Figure 5:
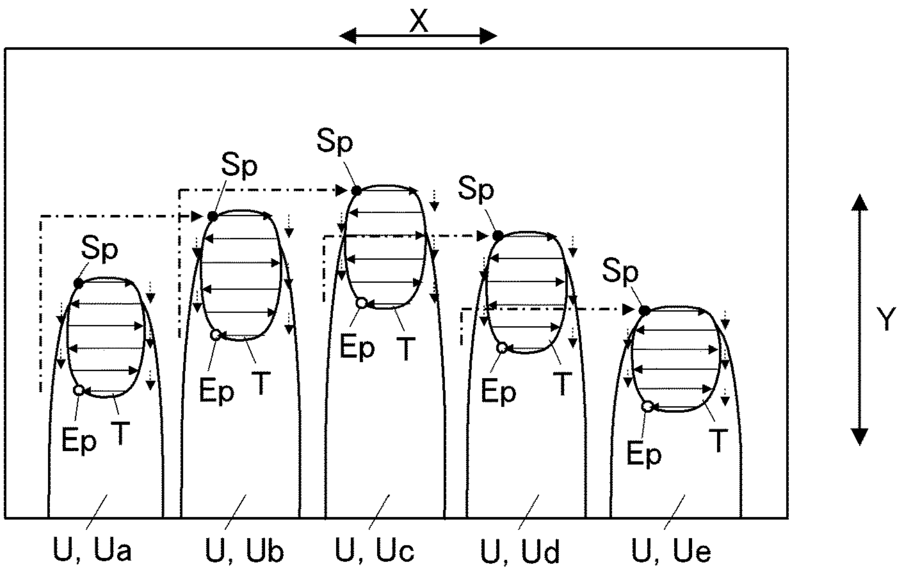
FIG. 5 is a schematic diagram for explaining the printing procedure when the printing start position is fixed to the upper side in the Y-axis direction of the nail.

The placement examples of printing finger U in FIG. 3, FIG. 5 and the following figures show the case where four fingers from the little finger to the index finger or five fingers including the thumb of the left hand are placed on finger stage 6.

That is, in the examples shown in FIG. 3 and other figures, the leftmost printing finger Ua is the little finger of the left hand. The position of the nail tip-side end of the printing area of the nail T of the little finger in the Y-axis direction is the coordinate Na1, and the position in the Y-axis direction of the root-side end of the nail T is the coordinate Nb1. The printing finger Ub placed on the right side of the little finger is the ring finger of the left hand. The position of the nail tip-side end of the printing area of the nail T of the ring finger in the Y-axis direction is the coordinate Na2, and the position in the Y-axis direction of the root-side end of the nail T is the coordinate Nb2. The printing finger Uc placed on the right side of the ring finger is the middle finger of the left hand. The position of the nail tip-side end of the printing area of the nail T of the middle finger in the Y-axis direction is the coordinate Na3, and the position in the Y-axis direction of the root-side end of the nail T is the coordinate Nb3. The rightmost printing finger Ud is the index finger. The position of the nail tip-side end of the printing area of the nail T of the index finger in the Y-axis direction is the coordinate Na4, and the position in the Y-axis direction of the root-side end of the nail T is the coordinate Nb4.

The types and number of fingers placed on the finger stage 6 are not limited to the example shown in the drawings.

As mentioned above, since FIG. 3 illustrates the case where nail printing is performed on the entire surface of the nail T (i.e., where the "printing area" coincides with the outline of the nail T), the nail tip-side end and the nail T root-side end of the printing area coincide with the nail tip-side end and the root-side end of the nail T itself. On the other hand, in the case where only a part of nail T is the printing area (for example, in the case of French nail where only the tip of the nail is printed), the root-side end of nail T in the printing area may be located around the center of nail T in the Y-axis direction. In this case, printing processing can be performed using the same method as in the following embodiment.

The information used for the nail information obtainer 313 to identify the printing area for the nail T of the printing finger U is not limited to the nail image. For example, if a sensor is installed to detect the area where the nail T is placed, the information detected by the sensor may be used.

The nail information obtainer 313 detects various nail information about the nail T of the printing finger U based on the nail image of the printing finger U captured by the photographing device 51.

The nail information includes, for example, the outline of nail T (nail shape, XY coordinates of horizontal position of nail T, etc.), the inclination angle of the surface of nail T with respect to the XY plane (inclination angle of nail T, nail curvature), etc. When the height of the nail T (vertical position of the nail T) can be obtained from the image taken by the photographing device 51, the height of the nail T is also included in the nail information.

The information obtained by the nail information obtainer 313, such as coordinates of the outline that defines the printing area, the coordinates of the outline of nail T, the curvature, and other information, is stored in the nail information storage area 322 of the storage 32.

The printing data generator 314 generates printing data corresponding to the area of nail T and printing area (coordinates defining the outline of each area) identified by the nail information obtainer 313.

Specifically, when the printing area (area that is planned to be printed in the area of nail T) set (identified) by the nail information obtainer 313, the printing data generator 314 cuts the nail design data (original data) according to the printing area, adjusts the shape and size as appropriate to fit the data to the printing area, and then generates the printing data.

If nail information such as the curvature of the nail T is detected by the nail information obtainer 313, the printing data generator 314 takes this nail information into account and makes the necessary corrections such as curved surface correction, and generates the printing data for the printing unit 40 to print on the printing area from the nail design data (original data).

The printing controller 315 is a controller that controls the head moving mechanism 49 (X-direction moving motor 46 and Y-direction moving motor 48, etc., which constitute the head moving mechanism 49), the print head 41, etc. of the printing unit 40.

The printing controller 315 controls the components of the printing unit 40 to print the nail design on the "printing area" of the nail T based on the printing data generated by the printing data generator 314.

Figure 6:
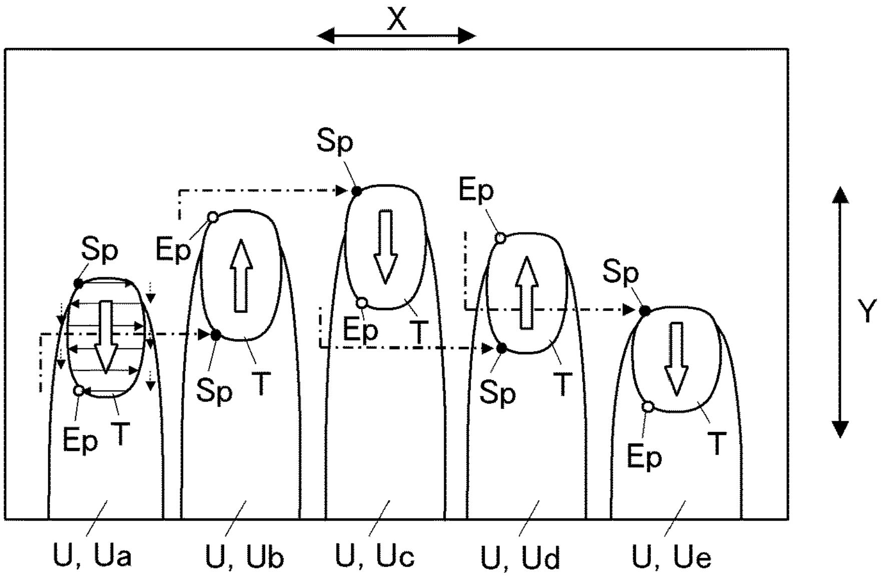
FIG. 6 is an explanation view showing an example of the sub-scanning direction when printing for multiple printing fingers.

In the embodiment, the printing controller 315 sets where to start printing for the printing area of each printing finger U, and the printing start position (referred to as printing start position Sp in FIG. 6, etc.).

In other words, the printing controller 315 controls the print head 41 and the head moving mechanism 49 to perform printing while moving in the main scanning direction from the printing start position Sp of the printing area in the first nail to be printed (the nail T of the printing finger U to be printed first among the printing fingers U placed in the finger stage 6, for example, the nail T of the printing finger Ua in FIG. 6). After, the printing for the first nail is finished, the printing controller 315 controls to start printing on the printing area in the second nail from the printing start position Sp that was set at the end on the side closer to the printing end position (printing end position Ep in FIG. 6, etc.) of the printing area in the first nail among the nail tip-side end and the root-side end of the printing area in the second nail to be printed next (the nail T of the printing finger U to be printed next among the printing fingers U placed in the finger stage 6, for example, the nail T of the printing finger Ub in FIG. 6).

For example, as shown in FIG. 3, when the nail tip-side end of the printing area is specified as the coordinate Na of the nail tip-side end (coordinates Na1 to Na4 indicating the positions in the Y-axis direction, which is the length direction of the nail) and the root-side end of the nail T is specified as the coordinate Nb of the root-side end (coordinates Nb1 to Nb4 indicating the positions in the Y-axis direction, which is the length direction of the nail), the printing controller 315 functions as a coordinate comparison unit that compares the coordinate Na of the nail tip-side end (coordinates Na1 to Na4) and the root-side end Nb (coordinates Nb1 to Nb4) with the coordinate of the printing end position Ep of the printing area in the first nail. Based on the comparison results of them, the printing controller 315 then determines/decides which of the nail tip-side end (coordinates Na1 to Na4) and the root-side end (coordinates Nb1 to Nb4) is to be set as the printing start position Sp of the printing area for the nail T (second nail) of the printing finger U to be printed next.

The specific setting of the printing start position Sp by the printing controller 315 will be described later.

Next, referring to FIG. 4 to FIG. 13, the printing method of the nail printing device 1 of the embodiment will be described.

Figure 4:
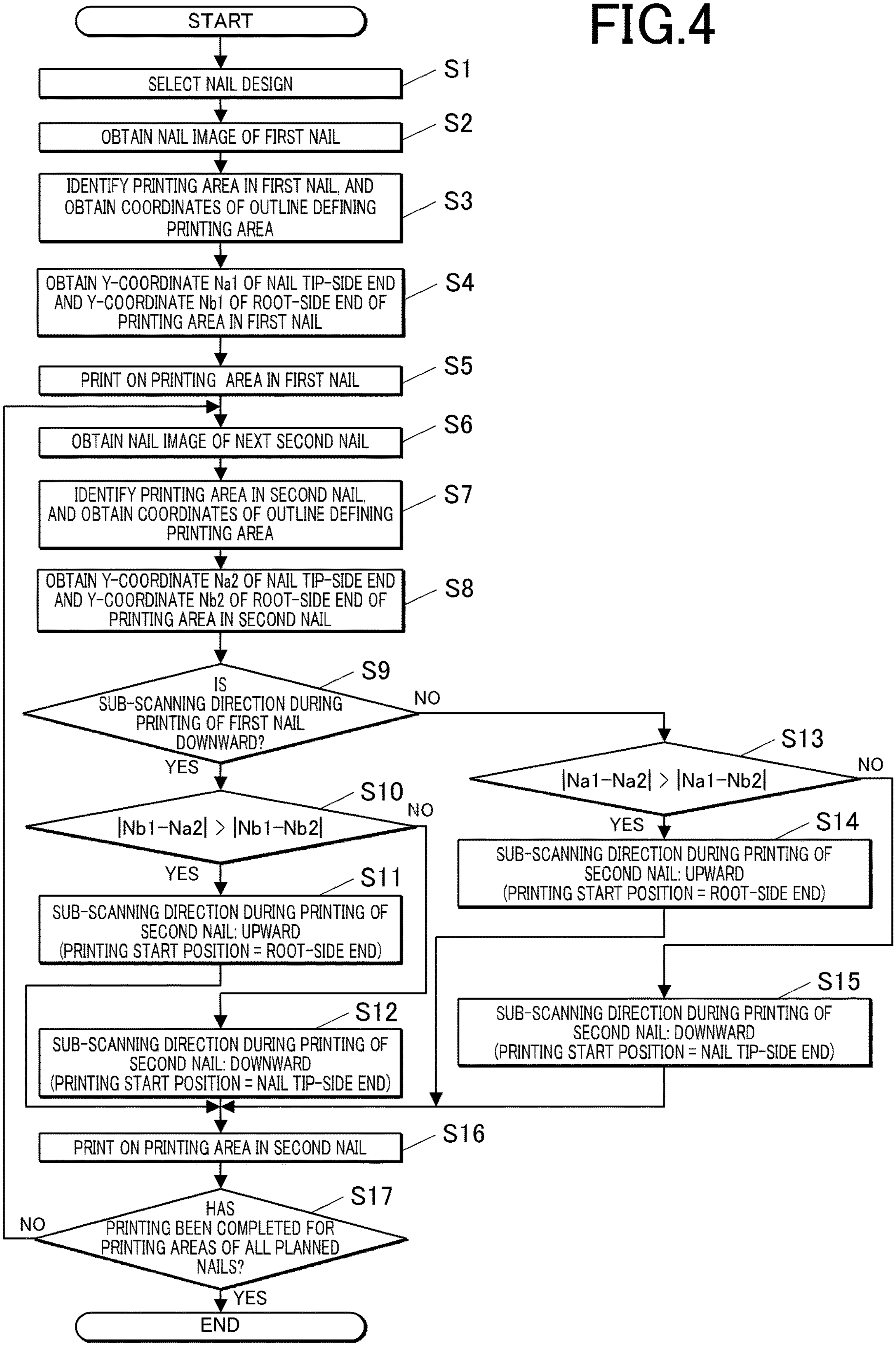
FIG. 4 is a flowchart showing printing processing in the embodiment.

FIG. 4 is a flowchart showing the printing processing in the embodiment.

When the power of the embodiment's nail printing device 1 is turned on, for example, a message instructing the user to select a nail design appears on the display 22. The user selects the nail design to be printed on the nail T by operating the operation unit 21, touch panel or the like.

Thus, an operation signal is sent to the control device 30, and the desired nail design is selected as the nail design to be printed on the nail T, as shown in FIG. 4 (Step S1).

When a nail design is selected by the user, the controller 31 (display controller 311) applies a base coat (or white ink if white is included) to the nail T to be printed, and then displays an instruction screen on the display 22 to instruct the user to insert said nail T (and its printing finger U) into the finger stage 6 of the nail printing device 1 to prompt the user to set the printing finger U.

When the printing finger U is set on the finger stage 6, the controller 31 causes the photographing unit 50 to photograph the printing finger Ua including the first nail which is the nail T of the printing finger U to be printed first (for example, the little finger that is the printing finger Ua in FIG. 3, etc.), and obtains the nail image of the first nail (nail T of the little finger) (Step S2).

When the nail image is obtained, the nail information obtainer 313 performs image analysis on the nail image and identifies the printing area in the first nail. Specifically, the nail information obtainer 313 obtains the XY coordinates of the outline that defines the printing area (Step S3).

In addition, the nail information obtainer 313 obtains Y-coordinate Na1 of nail tip-side end and Y-coordinate Nb1 of root-side end of the printing area in the first nail (Step S4).

In addition, the nail information obtainer 313 obtains other nail information such as the curvature, etc. of the nail T based on the nail image.

The XY coordinates of the outline of the printing area, the Y-coordinate Na1 of the nail tip-side end, the Y-coordinate Nb1 of the root-side end, and other various information obtained by the nail information obtainer 313 are stored in the nail information storage area 322. After the various nail information is obtained by the nail information obtainer 313, the printing data generator 314 fits the nail design to the printing area and generates the printing data with appropriate corrections.

When the XY coordinates of the outline of the printing area are obtained for the first nail to be printed, the printing controller 315 sets the printing start position Sp to the nail tip-side end Na1 or root-side end Nb1 of the first nail (nail T of the little finger of the left hand, which is the printing finger Ua in the example shown in the figure), and controls the print head 41 and the head moving mechanism 49 to print in the printing area according to the printing data while moving in the main scanning direction (X-axis direction in FIG. 6, etc.) from this printing start position Sp. As a result, printing is performed on the printing area (the entire surface of nail T in FIG. 6, etc.) in the first nail (nail T of the little finger of the left hand) (Step S5).

For example, in FIG. 6, the printing start position Sp is set at the nail tip-side end Na1, and the sub-scan is performed from top to bottom in the Y-axis direction (i.e., in the direction from the nail tip-side to the root-side), as shown by the white arrow in FIG. 6.

There is no restriction on whether the printing start position Sp for the first nail is set at the nail tip-side end (Y-coordinate Na1) or the root-side end (Y-coordinate Nb1).

For example, if the printing controller 315 can know the position of the printing area of nail T (e.g., the printing area of nail T of the ring finger or middle finger, etc.) which is planned to be printed following the first nail at the time of printing the first nail, it is preferable to set the printing start position Sp to the side that enables smoother and faster printing operation, taking into account the arrangement of other printing fingers U set on the finger stage 6.

When printing is finished for the first nail (nail T on the little finger of the left hand), the printing controller 315 sets the printing start position Sp for the printing area in the second nail to the side closer to the printing end position Ep (see FIG. 6, etc.) of the first nail among the coordinate Na2 of the nail tip-side end of the printing area in the nail T of printing finger U to be printed next (this is called "the second nail") and the coordinate Nb2 of the root-side end of nail T (see FIG. 3). The printing controller 315 then controls the print head 41 and the head moving mechanism 49 to perform printing from the printing start position Sp.

To be specific, the controller 31 causes the photographing unit 50 to photograph the printing finger Ub including the second nail which is the nail T of the printing finger U to be printed second (for example, the ring finger in this example), and obtains the nail image of the second nail (nail T of the ring finger) (Step S6).

When the nail image is obtained, the nail information obtainer 313 performs image analysis on the nail image and identifies the printing area in the second nail. Specifically, the nail information obtainer 313 obtains the XY coordinates of the outline that defines the printing area (Step S7).

In addition, the nail information obtainer 313 obtains Y-coordinate Na2 of nail tip-side end and Y-coordinate Nb2 of root-side end (see FIG. 3) in the outline of the printing area in the second nail (Step S8).

The printing controller 315 controls the print head 41 and the head moving mechanism 49 to perform printing by setting the printing start position Sp of the second nail at the end closer to the printing end position Ep for the first nail (nail T of the little finger of left hand) among the nail tip-side end Na2 and the root-side end Nb2 (see FIG. 3) of the nail of the printing area in the second nail to be printed next (the nail T of the ring finger Ub of the left hand).

How to set the printing start position Sp of the second nail by the printing controller 315 in this embodiment will be described in detail.

When printing on the printing area of nail T, the printing start position Sp is set on either side of the coordinate Na of the nail tip-side end or the coordinate Nb of the root-side end of the nail in the printing area of nail T, as shown in FIG. 5 and FIG. 6, for example, and The printing operation by the printing unit 40 is performed while moving in the main scanning direction (X-axis direction) indicated by the horizontal arrow. The printing unit 40 repeats the reciprocating movement that when reaching the end of the printing area in the main scanning direction, the printing unit 40 moves one line in the sub-scanning direction (Y-axis direction) indicated by the vertical arrow, and then moves back along the main scanning direction to the opposite side of the printing area. For example, the printing operation is completed for the printing area of one nail T in two or three round trips. The same operation is repeated by moving to the nail T to be the next printing area.

At this time, conventionally, the printing start position Sp was always fixed to one side of the Y-axis direction (i.e., either the coordinate Na of the nail tip-side end or the coordinate Nb of the root-side end). Thus, for example, as shown in FIG. 5, in the case where the printing start position Sp is set to the coordinate Na of the nail tip-side end, even if the print head 41 has moved to the coordinate Nb of the root-side end of nail T at the time when the printing operation on the printing area is completed for the first printing finger U (e.g., printing finger Ua in FIG. 5), the print head 41 is moved in the Y-axis direction (sub-scanning direction) to the printing start position Sp at the nail tip-side end to start printing on the printing area of the next printing finger U (e.g., printing finger Ub in FIG. 5), and the movement direction during sub-scanning in each printing finger U was all downward along the Y-axis direction.

However, as shown in FIG. 5, when printing is performed while moving from one end (e.g., nail tip-side end Na1) to the other end (e.g., root-side end Nb1 of nail T) in the Y-axis direction (sub-scanning direction) of the printing area, in general, the printing end position Ep is often closer to the coordinate Nb2 of the root-side end than to the coordinate Na2 of the nail tip-side end of the nail T of the second printing finger U (e.g., printing finger Ub in FIG. 5) to be printed next. In contrast, when the printing start position Sp is set at the root-side end Nb1 of nail T and printing is performed while moving from the coordinate Nb1 of the root-side end to the coordinate Na1 of the nail tip-side end, the printing end position Ep is often in the position closer to the coordinate Na2 of the nail tip-side end than to the coordinate Nb2 of the root-side end of nail T of the second printing finger U (e.g., printing finger Ub in FIG. 5) to be printed next.

For this reason, when printing sequentially on the nail T of multiple printing fingers U, the movement distance to move to the printing start position Sp of the finger to be printed next becomes shorter by alternately setting the printing start position Sp up and down (up and down in FIG. 6, etc.) in the Y-axis direction (sub-scanning direction) as shown in FIG. 6 and printing alternately along the Y-axis direction as shown by the white arrow in FIG. 6, rather than by fixing the printing start position Sp at the end on one side in the Y-axis direction (sub-scanning direction) as shown in FIG. 5.

However, the shape of a person's hand, the length of each finger, etc. is unique and does not necessarily fit into a certain rule.

Figure 7:
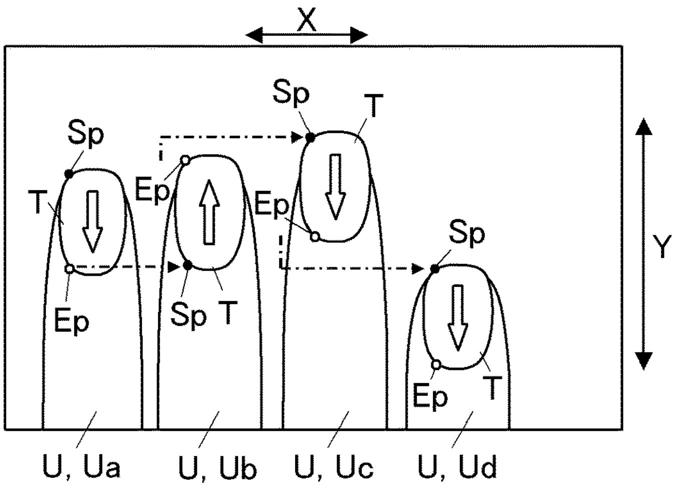
FIG. 7 is an explanation view showing an example of the sub-scanning direction when printing for multiple printing fingers.

For example, in the example shown in FIG. 7, when the four printing fingers U are set on the finger stage 6, only the rightmost printing finger Ud (e.g., index finger) is placed at an extremely low position in the Y-axis direction.

In this case, different from the case of FIG. 6, when moving from the third printing finger Uc (e.g. middle finger) to the fourth printing finger Ud (e.g. index finger), as shown in FIG. 7, printing processing can be done efficiently by eliminating wasted movement time by setting the printing start position Sp to the coordinate Na of the nail tip-side end for both fingers and performing printing while moving from up to down (that is, from nail tip-side to the root-side) for both of the printing finger Uc (e.g. middle finger) and printing finger Ud (e.g. index finger), rather than setting the printing start position Sp alternately up and down (up and down in FIG. 6, etc.) in the Y-axis direction (sub-scanning direction) for all printing fingers U.

Thus, in the embodiment, the printing controller 315 controls the print head 41 and the head moving mechanism 49 to print on the printing area while moving in the main scanning direction X from the printing start position Sp (see FIG. 6, etc.) set at the nail tip-side end Na1 and the coordinate Nb1 of root-side end of the nail T of the printing area (see FIG. 3, etc.) in nail T (referred to as "first nail") of one printing finger U among the nails T of the printing fingers U placed on the finger stage 6. After the printing on the "first nail" is finished, the printing controller 315 controls the print head 41 and the head moving mechanism 49 to print by setting the printing start position Sp of the "second nail" to the side closer to the printing end position Ep of the "first nail" (coordinate Na1 of the nail tip-side end or coordinate Nb1 of the root-side end of nail T where the printing end position Ep is located, see FIG. 6, etc.) among the coordinate Na2 of the nail tip-side end and the coordinate Nb2 (see FIG. 3, etc.) of the root-side end of nail T of the printing area in the nail T of the printing finger U (referred to as "second nail") to be printed next.

Specifically, when printing of the "first nail" is completed, the printing controller 315 determines whether the sub-scanning direction at the time of printing of the "first nail" is downward in the Y-axis direction (white arrow in FIG. 6, etc.; downward) (Step S9).

If the sub-scanning direction is downward (Step S9; YES), the printing controller 315 determines whether the distance between the coordinate Nb1 of the root-side end of the nail T where the printing end position Ep is located for the "first nail" and the coordinate Na2 of the nail tip-side end of the printing area for the "second nail" (interval|Nb1-Na2|) is greater than the distance (interval|Nb1-Nb2|) between the coordinate Nb1 at the root-side end and the coordinate Nb2 at the root-side end (Step S10).

If the coordinate Nb2 of the root-side end in the "second nail" is closer to the coordinate Nb1 of the root-side end of the nail T where the printing end position Ep of the "first nail" is located (i.e., interval|Nb1-Na2| is greater than interval |Nb1-Nb2|, step S10; YES), the printing controller 315 sets the printing start position Sp of the printing area in the "second nail" to the root-side end (coordinate Nb2), and sets the sub-scanning direction Y for printing to be upward from bottom to top (Step S11).

On the other hand, if the coordinate Na2 of the nail tip-side end in the "second nail" is closer to the coordinate Nb1 of the root-side end of nail T where the printing end position Ep of the "first nail" is located (Step S10; NO), the printing controller 315 sets the printing start position Sp of the printing area in the "second nail" to the nail tip-side end (coordinate Na2), and sets the sub-scanning direction Y during printing to downward from top to bottom (Step S12).

If the sub-scanning direction is upward (Step S9; NO), the printing controller 315 determines whether the distance (interval |Na1-Na2|) between the coordinate Na1 of the nail tip-side end where the printing end position Ep is located for the "first nail" and the coordinate Na2 of the nail tip-side end of the printing area for the "second nail" is greater than the distance (interval |Na1-Nb2|) between the coordinate Na1 of the nail tip-side end and the coordinate Nb2 of the root-side end (Step S13).

If the coordinate Nb2 of the root-side end in the "second nail" is closer to the coordinate Na1 of the nail tip-side end where the printing end position Ep of the "first nail" is located (i.e., interval |Na1-Na2| is greater than interval |Na1-Nb2|, Step S13; YES), the printing controller 315 sets the printing start position Sp of the printing area in the "second nail" to the root-side end (coordinate Nb2), and the sub-scanning direction Y during printing is upward from bottom to top (Step S14).

On the other hand, if the coordinate Na2 of the nail tip-side end in the "second nail" is closer to the coordinate Nb1 of the root-side end of nail T where the printing end position Ep of the "first nail" is located (Step S13; NO), the printing controller 315 sets the printing start position Sp of the printing area in the "second nail" to the nail tip-side end (coordinate Na2), and sets the sub-scanning direction Y during printing to downward from top to bottom (Step S15).

While referring to FIG. 6 through FIG. 14, the method of printing start position Sp will be explained in detail. The description of the Y-coordinate Na of the nail tip-side end and the Y-coordinate Nb of the root-side end is based on the example in FIG. 3.

For example, FIG. 6 shows an example of completing printing of the printing area by setting the printing start position Sp of nail T (the first nail) of the little finger which is the first printing finger Ua to the nail tip-side end (Y-coordinate Na1), and scanning the surface of nail T back and forth three times. In this case, printing on the printing area of nail T (the first nail) of the little finger is performed from the printing start position Sp set at the nail tip-side end toward the root-side end (i.e., the sub-scanning direction is downward as shown by the white arrow, from the nail tip-side to the root-side of nail T). The Y-axis position of printing end position Ep is the root-side end of nail T (Y-coordinate Nb1).

The printing controller 315 then compares the distance between the root-side end (Y-coordinate Nb1) where the printing end position Ep of nail T (first nail) of the little finger is located and the nail tip-side end (Y-coordinate Na2) of nail T (second nail) of the ring finger which is the second printing finger Ub with the distance between the coordinate Nb1 and the root-side end of the nail T of the ring finger (Y-coordinate Nb2). As shown in FIG. 6, in this case, since the coordinate Nb2 is closer to the coordinate Nb1, the printing controller 315 sets the printing start position Sp of the nail T (the second nail) of the ring finger to the root-side end of the nail T of the ring finger.

In this case, printing on the printing area of nail T (second nail) of the ring finger is done from the printing start position Sp set at the root-side end toward the nail tip-side end (i.e., the sub-scanning direction is upward as shown by the white arrow), and the printing end position Ep is the nail tip-side end of nail T (Y-coordinate Na2).

The printing controller 315 then compares the distance (interval) between the nail tip-side end (Y-coordinate Na2) where the printing end position Ep of nail T (second nail) of the ring finger is located and the nail tip-side end (Y-coordinate Na3) of nail T (next second nail) of the middle finger which is the third printing finger Uc with the distance (interval) between the coordinate Na2 and the root-side end of the nail T of the middle finger (Y-coordinate Nb3). As shown in FIG. 6, in this case, since the coordinate Na3 is closer to the coordinate Na2, the printing controller 315 sets the printing start position Sp of the nail T of middle finger (the next second nail) to the nail tip-side end of the nail T of middle finger.

In this case, printing on the printing area of nail T (next second nail) of the middle finger is done from the printing start position Sp set at the nail tip-side end toward the root-side end (i.e., the sub-scanning direction is downward as shown by the white arrow), and the printing end position Ep is the root-side end of nail T (Y-coordinate Nb3).

In the same way, for the nail T of the index finger, which is the fourth printing finger Ud, and the nail T of the thumb, which is the fifth printing finger Ue, as the "next second nail", the printing controller 315 repeats the same determination process and prints on the printing area of every nail T.

In the example shown in FIG. 6, the movement of each printing finger U in the sub-scanning direction (Y-axis direction) is alternately up and down as "down, up, down, up, down".

When printing from one end of the vertical direction (vertical direction in FIG. 6, etc., the extending direction of nail T) to the other end for nail T in a general human finger, the end on the same side as the printing end position Ep has a smaller movement distance in the sub-scanning direction (Y-axis direction) to move to the next printing area.

For this reason, it is often desirable to set the printing start position Sp to positions that are alternately located up and down, in order to perform printing sufficiently. Thus, default setting may be made to the printing start position Sp so that, when the printing start position Sp in the sub-scanning direction of the first printing finger Ua is determined, the printing start position Sp is set to alternate up and down based on this. In this way, the printing controller 315 can perform the printing operation in the appropriate line of motion without having to set the printing start position Sp for each finger.

In other words, in this case, when the printing start position Sp in the sub-scanning direction (Y-axis direction) of the first printing finger Ua is set at the nail tip-side end, as in the case of FIG. 6, the direction of movement during sub-scanning for each printing finger U is "down, up, down, up, down". On the contrary, when the printing start position Sp in the sub-scanning direction (Y-axis direction) of the first printing finger Ua is set at the root-side end, the sub-scanning movement direction of each printing finger U is "up, down, up, down, up".

The next example shown in FIG. 7, different from FIG. 6, shows a case where the fourth printing finger Ud (index finger) is extremely short. In this case, printing on the printing area of nail T of the third printing finger Uc (middle finger) is finished at the root-side end. However, when moving to the next fourth printing finger Ud (index finger), the movement distance is shorter if moving to the nail tip-side end than moving to the same root-side end.

For this reason, the printing controller 315 sets the printing start position Sp to each side that is judged to have the shorter movement distance. In this case, the movement direction of the sub-scanning of each printing finger U is "down, up, down, down" as shown by the white arrows.

Figure 8:
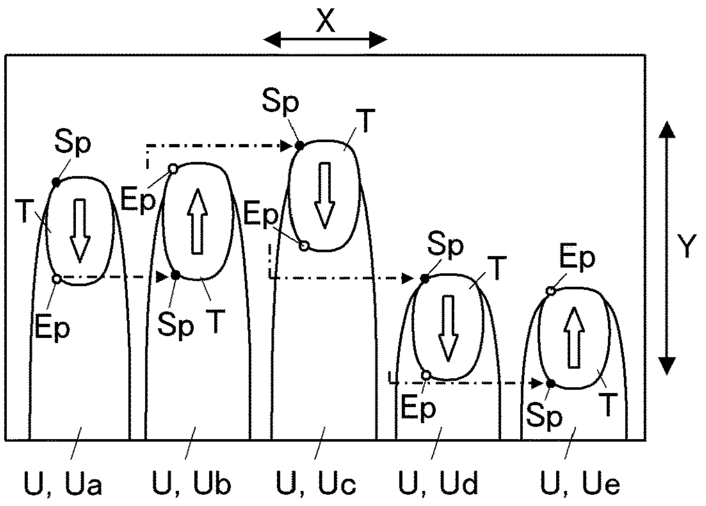
FIG. 8 is an explanation view showing an example of the sub-scanning direction when printing for multiple printing fingers.

The example shown in FIG. 8 is the case where the thumb is further assumed to be the fifth printing finger Ue in the example of FIG. 7. In this case, the fourth printing finger Ud (index finger) and the fifth printing finger Ue (thumb) are short to the same degree. For this reason, when moving to the printing area of the fifth printing finger Ue after the printing on the nail T of the fourth printing finger Ud has finished, moving to the end on the same side as the printing end position Ep (root-side end in FIG. 8) has a shorter movement distance in the sub-scanning direction (Y-axis direction).

For this reason, the printing controller 315 sets the printing start position Sp to each side that is judged to have the shorter movement distance. In this case, the movement direction of the sub-scanning of each printing finger U is "down, up, down, down, up" as shown by the white arrows.

Figure 9:
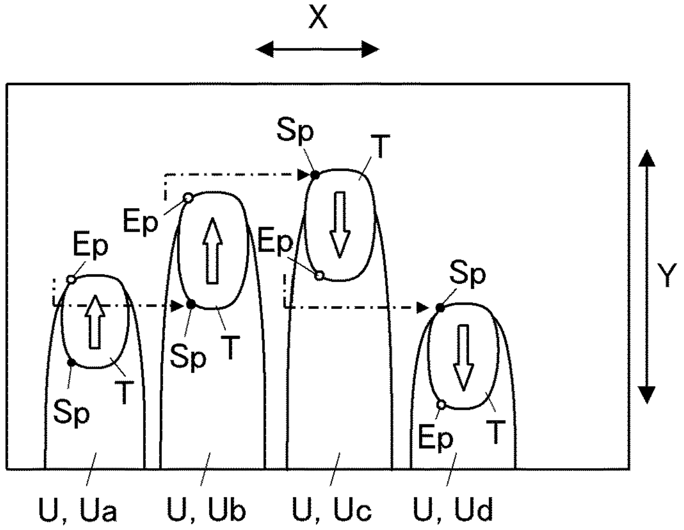
FIG. 9 is an explanation view showing an example of the sub-scanning direction when printing for multiple printing fingers.

The example shown in FIG. 9 is an example when the printing start position Sp in the sub-scanning direction (Y-axis direction) of the first printing finger Ua is set at root-side end.

When printing in the printing area of the first printing finger Ua, printing moves from bottom to top as shown by the white arrow. In this example, the second printing finger Ub is long and the position of nail T is on the upper side of the sub-scanning direction (Y-axis direction). Therefore, to move from the printing end position Ep of the printing area of the first printing finger Ua to the printing area of the second printing finger Ub, moving to the root-side end has a shorter movement distance than moving to the nail tip-side end.

Also, in the example of FIG. 9, the fourth printing finger Ud is much shorter than the third printing finger Uc. For this reason, though the printing end position Ep of the printing area of the third printing finger Uc comes to the root-side end, when moving from the printing end position Ep of the third printing finger Uc to the printing area of the fourth printing finger Ud, moving to the nail tip-side end has a shorter movement distance than moving to the root-side end.

For this reason, the printing controller 315 sets the printing start position Sp to each side that is judged to have the shorter movement distance. As a result, the sub-scanning movement direction of each printing finger U in the case of FIG. 9 is "up, up, down, down" as shown by the white arrows.

Figure 10:
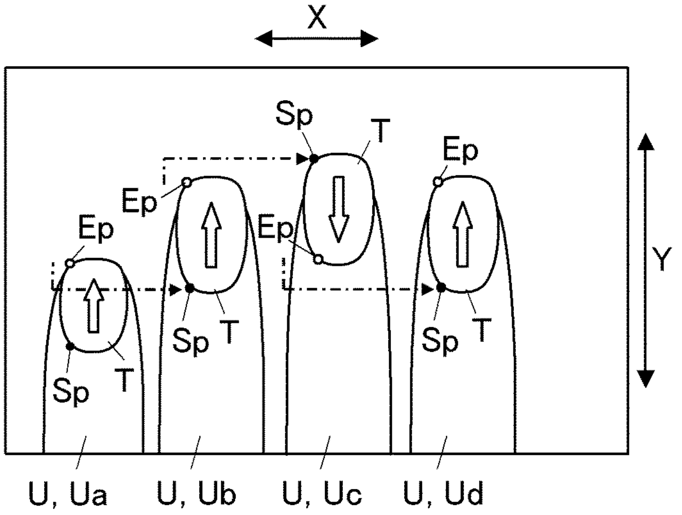
FIG. 10 is an explanation view showing an example of the sub-scanning direction when printing for multiple printing fingers.

The example shown in FIG. 10 differs from the example shown in FIG. 9 in that the third printing finger Uc and the fourth printing finger Ud are almost the same length. Therefore, in the case where the printing end position Ep of the third printing finger Uc comes to the root-side end, when moving from the printing end position Ep of the third printing finger Uc to the printing area of the fourth printing finger Ud, moving to the root-side end has a shorter movement distance than moving to the nail tip-side end.

For this reason, the printing controller 315 sets the printing start position Sp to each side that is judged to have the shorter movement distance. As a result, the sub-scanning movement direction of each printing finger U in the case of FIG. 10 is "up, up, down, up" as shown by the white arrows, different from the case of FIG. 9.

In the case where the nail design selected by the user is to be applied to the entire nail, the outline of the printing area matches the outline of the area of nail T, as shown in FIG.

6, etc. Therefore, the Y-coordinate Na of the nail tip-side end is the coordinate of the nail tip-side end of the area of nail T, and the Y-coordinate Nb of the root-side end is the coordinate of the root-side end of the area of nail T.

On the other hand, in the case where the nail design selected by the user is a French nail, etc., the printing area is part of the area of nail T.

Figure 11:
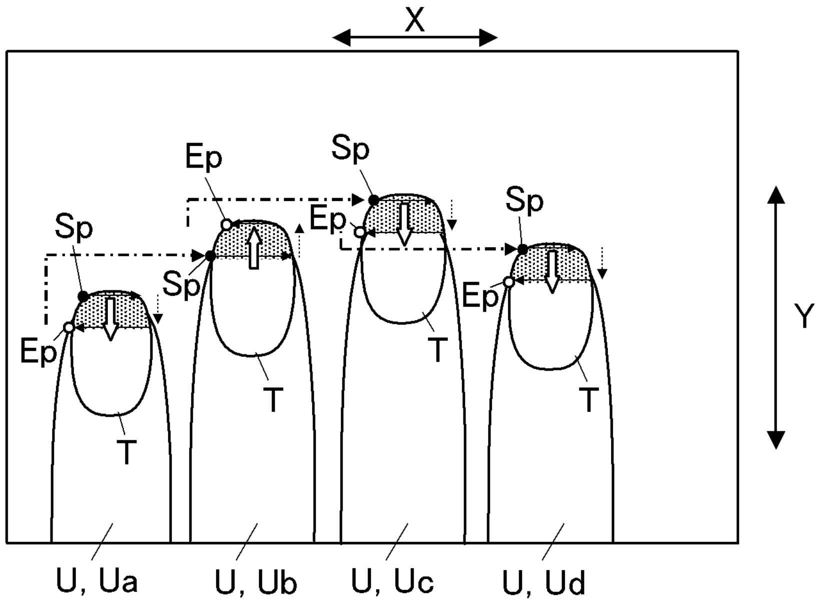
FIG. 11 is an explanation view showing an example of the sub-scanning direction when printing on only a part of the nail for multiple printing fingers.

For example, FIG. 11 shows an example where only the nail tip is printed. In FIG. 11, the shaded area is the printing area where printing is applied.

In such a way, even if the printing area does not coincide with the outline of nail T, the Y-coordinate Na of the nail tip-side end in the printing area is the coordinate of the end on the side closer to the tip of nail T in the printing area, and the Y-coordinate Nb of the root-side end is the coordinate of the end on the side closer to the root of nail T in the printing area.

In this case, the decision on whether to set the printing start position Sp to the nail tip-side end or the root-side end is the same as in FIG. 3 and FIG. 6.

In other words, in the case where the printing start position Sp in the sub-scanning direction (Y-axis direction) of the first printing finger Ua is set at the nail tip-side end, the printing end position Ep is at the root-side end, and the length of the second printing finger Ub is about the same length as that of the printing finger Ua, the printing start position Sp in the printing area of the second printing finger Ub is set at the root-side end, which is the end on the same side as the printing end position Ep.

In the example shown in FIG. 11, the printing end position Ep of the printing area of the third printing finger Uc comes to the root-side end, but the fourth printing finger Ud is shorter than the third printing finger Uc. When moving from the printing end position Ep of the third printing finger Uc to the printing area of the fourth printing finger Ud, moving to the nail tip-side end has a shorter movement distance than moving to the root-side end.

For this reason, the printing controller 315 sets the printing start position Sp to each side that is judged to have the shorter movement distance. Thus, in the case of FIG. 11, the movement direction of the sub-scan of each printing finger U is "down, up, down, down" as shown by the white arrows. In this way, the printing start position of each finger may be set so that the shortest overall movement path is achieved by considering the nails of all fingers of the printing finger U.

So far, illustration has been made for the case where the scanning direction in the line direction (i.e., the main scanning direction) when printing on the printing area is the nail width direction (X-axis direction) and the moving direction to the next line (i.e., the sub-scanning direction) is the extending direction of nail T (Y-axis direction). However, if the main scanning direction and the sub-scanning direction are reversed, it is possible to set the printing start position Sp for each printing area in the same way.

Figure 12:
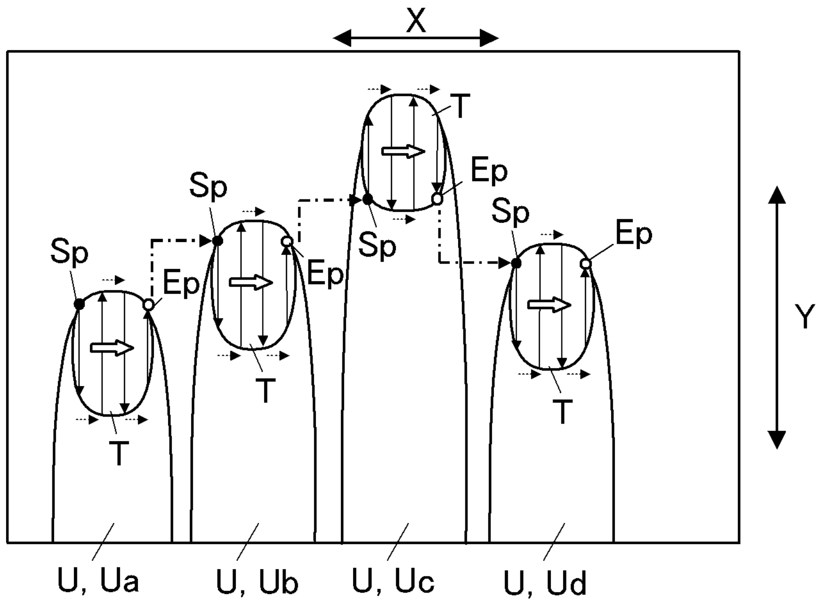
FIG. 12 is an explanation view showing an example of a route when moving to the next printing area in the case where the main scanning direction of printing for multiple printing fingers is the nail length direction.

FIG. 12 is an example where the main scanning direction when the print head 41 prints on the printing area is the nail extending direction (Y-axis direction) and the sub-scanning direction is the nail width direction (X-axis direction). In FIG. 12, the main scanning direction is shown by solid lines and the sub-scanning direction by dotted lines.

When the main scanning direction is the extending direction of the nail (Y-axis direction), the movement direction of the sub-scan is always a certain direction toward the unprinted neighboring printing finger U (the direction of finger arrangement according to the printing order of the printing finger U), which is from left to right in FIG. 12*s*, as shown by the white arrows.

However, when moving from the printing end position Ep to the printing area of the next printing finger U, the nail tip-side end has a shorter movement distance in some cases and the root-side end has a shorter movement distance in other cases, depending on the length of the printing finger U, the size of the nail T, etc.

For example, in FIG. 12, if the printing area of the first printing finger Ua has a printing end position Ep at the nail tip-side end, when moving from the present printing end position Ep to the printing area of the second printing finger Ub, moving to the nail tip-side end has a shorter movement distance than moving to the root-side end. For this reason, the printing controller 315 sets the printing start position Sp of the printing area of the second printing finger Ub to the nail tip-side end.

On the other hand, the third printing finger Uc, is much longer than the second printing finger Ub. When moving from the printing end position Ep of the printing area of the second printing finger Ub to the printing area of the third printing finger Uc, moving to the root-side end has a shorter movement distance than moving to the nail tip-side end. Also, the fourth printing finger Ud is much shorter than the third printing finger Uc. When moving from the printing end position Ep of the printing area of the third printing finger Uc to the printing area of the fourth printing finger Ud, moving to the root-side end has a shorter movement distance than moving to the nail tip-side end.

The printing controller 315 sets the printing start position Sp to each side where the movement distance is judged to be shorter, and prints on each printing area.

For this reason, the same process as in FIG. 3, FIG. 6, etc. is used to set the printing start position Sp on the side closer to the printing end position Ep of the previous printing finger U among the nail tip-side end and the root-side end.

In addition, depending on the size of the print head 41, the angle of view of the photographing device 51, etc., after printing is completed for the printing area of one printing finger U, it may be necessary to move the print head 41 once from the printing end position Ep in order to photograph the nail image of the next printing finger U.

In this case, as shown in FIG. 13, if the print head 41 is moved in the X-axis direction, it is sufficient that the print head 41 is moved in the X-axis direction again to return to the printing start position Sp for printing, which does not affect the printing start position Sp set in the Y-axis direction.

FIG. 6 and FIG. 8 illustrate a case where, when five fingers are placed on the finger stage 6, the five fingers of one hand from the little finger to the thumb (printing fingers Ua to Ue) are placed. However, the printing finger U that is placed on the finger stage 6 is not limited to the fingers of one hand.

Due to the structure of the human hand, it is difficult to place the thumb side by side with the other fingers of the same hand, and even if it is possible, the nail T of thumb is difficult to place properly facing the ink ejection surface of the print head 41. In addition, the length of the thumb often differs greatly from the length of the other four fingers, and there is a risk that it may not fit within the printing possible range of the printing unit 40 and the photographing possible range of the photographing unit 50 (for example, within the range of the opening that exposes the nail T in the finger stage 6).

For this reason, for example, as shown in FIG. 13, the thumb of the right hand (printing finger Uf in FIG. 13) may be placed next to the four fingers from the little finger to the index finger of the left hand.

In order to print quickly and efficiently by minimizing the movement of the print head 41 as much as possible, it is preferable that the positions of the nail T in the sub-scanning direction (Y-axis direction) are as aligned as possible.

For this reason, if the four fingers other than the thumb of one hand (e.g., the left hand) (printing fingers Ua to Ue in FIG. 13) and the thumb of the opposite hand (e.g., the right hand) (printing finger Uf in FIG. 13) are placed on the finger stage 6, it is preferable to have a configuration that urges the user to place the thumb fingertip as close as possible to the fingertips of the little finger to index finger, such as by providing a rest on which to place the nail T at the target position where the fingertip should be placed. In this case, the rest on which the nail T is placed may be provided only at the position corresponding to the thumb placement, or may also be provided at the position corresponding to the other four finger placements.

The description has been do far made for the case of setting the printing start position Sp of the printing area in the "second nail" to the side that is closer to the printing end position Ep among the nail tip-side end and root-side end of the printing area in the "second nail". However, setting is made as appropriate regarding how to deal with the case where the distance from the printing end position Ep (coordinate Na, Nb of the nail tip-side end or root-side end where printing end position Ep is located, e.g., coordinate Na1 or Nb1) to coordinate Na2 of nail tip-side end is equal to or equivalent to the distance from coordinate Na1 or Nb1 to coordinate Nb2 of root-side end.

For example, in such a case, it may be set in advance by default to set the printing start position Sp at the nail tip-side end or set the printing start position Sp at the root-side end. In this case, the user may be able to change this default setting.

Also, for example, in the case where the printing controller 315 can know factors other than the printing area in the "second nail", such as the position of the nail T that is planned to be printed next to the "second nail", before setting the printing start position Sp for the "second nail", these factors may be taken into account to determine the side that is suitable for printing more efficiently by minimizing unnecessary movement of the print head 41.

FIG. 14 illustrates a case where the coordinate Nb3 (see FIG. 3) in the Y-axis direction of the printing end position Ep of the third printing finger Uc to the coordinate Na4 of the nail tip-side end of the printing area of the fourth printing finger Ud is substantially equal to the distance from the coordinate Nb3 in the Y-axis direction of printing end position Ep to the coordinate Nb4 of root-side end.

In this case, the printing controller 315 grasps the location of the printing area of the fifth printing finger Ue next to the printing finger U (i.e., the fourth printing finger Ud) to set the printing start position Sp. In setting the printing start position Sp to the printing area of the fourth printing finger Ud, which of the nail tip-side end or the root-side end of the printing area of the fourth printing finger Ud should be set as the printing start position Sp to enable efficient printing in the printing area of the fifth printing finger Ue is taken into account.

In the case shown in FIG. 14, if the sub-scanning direction is downward from the nail tip-side to the root-side in printing in the printing area of the fourth printing finger Ud, the movement distance of the print head 41 can be shortened when moving to the printing area of the fifth printing finger Ue.

For this reason, the printing controller 315 sets the printing start position Sp at the nail tip-side end for the printing area of the printing finger Ud.

Up to this point, illustration has been made for a case where the printing controller 315 determines, for each printing finger U, the position of the nail tip-side end or root-side end of the next printing area to be printed and which of these is closer to the printing end position Ep. However, the method for setting the printing start position Sp is not limited to this.

For example, a table such as the one shown in FIG. 15 may be stored in the storage 32, etc. in advance, and the printing controller 315 may set the printing start position Sp of the printing area of each printing finger U by referring to the table.

There are no restrictions on the contents of the table or how to have it.

FIG. 15 illustrates an example of two types having different lengths of each printing finger U (different characteristics of the arrangement of each printing finger U) in the case where four fingers of the left hand (little finger to index finger) are arranged on the finger stage 6.

For example, left hand type 1 is the pattern in the sub-scaning direction when the middle finger (printing finger Uc) is the longest and the index finger (printing finger Ud) is much shorter than the middle finger (printing finger Uc), as illustrated in FIG. 9. In this case, when the printing start position Sp of the little finger (printing finger Ua) is set at the root-side end, the printing controller 315 refers to the table and sets the printing start position Sp at the root-side end for the ring finger (printing finger Ub), the nail tip-side end for the middle finger (printing finger Uc), and the nail tip-side end for the index finger (printing finger Ud), respectively. The movement in the sub-scanning direction is "up, up, down, down".

For example, left hand type 2 is the pattern in the sub-scanning direction when the middle finger (printing finger Uc) is the longest, and the index finger (printing finger Ud) is about the same length as the middle finger (printing finger Uc) as illustrated in FIG. 10. In this case, when the printing start position Sp of the little finger (printing finger Ua) is set at the root-side end, the printing controller 315 refers to the table and sets the printing start position Sp at the root-side end for the ring finger (printing finger Ub), at the nail tip-side end for the middle finger (printing finger Uc), and at the root-side end for the index finger (printing finger Ud), respectively.

It is preferable to prepare multiple types of tables in advance, depending on the number and type of printing fingers U to be placed on the finger stage 6, and whether the printing start position Sp is set at the nail tip-side end or the root-side end for the first printing finger U (the little finger in this embodiment). The pattern of the sub-scanning direction for each printing finger U (i.e., the setting pattern of the printing start position Sp) set in the table may be set based on the general human finger arrangement pattern (e.g., middle finger is the longest, thumb and little finger are short, etc.) obtained from an external server, etc.

The table may be automatically selected by the printing controller 315 based on the results of analysis by the nail information obtainer 313, etc., or the user may select the corresponding table according to user's own hand pattern.

Once a table is selected and applied, the table may be registered as applicable to the present user, and the same table may be automatically selected from the next time.

The pattern set based on the results of analysis by the nail information obtainer 313 may be stored and registered as a table in association with the present user. In this case, there may be a configuration that when a registered user prints on the same type and arrangement of printing fingers U (e.g., four fingers from the little finger to the index finger of the left hand), the appropriate printing processing can be performed by merely reading the table from the next time.

When the printing start position Sp of the printing area in the "second nail" is set, the printing controller 315 causes printing processing to be performed for the printing area in the "second nail" from the printing start position Sp (Step S16). When printing is finished, the printing controller 315 determines whether printing on nail T of all printing fingers U planned to be printed has been completed (Step S17). If all printing has been completed (Step S17; YES), the printing controller 315 ends the printing processing.

On the other hand, if printing has not been completed for all the nails T of the printing finger U that are planned to be printed (Step S17; NO), then the printing controller 315 repeats the processes from step S6 to step S17 for the nail T to be printed next to the "second nail" that has finished printing, as a new "second nail".

As described above, according to the embodiment, the printing controller controls the print head 41 and the head moving mechanism 49 to perform printing, while moving in the main scanning direction, from the printing start position Sp of the printing area in the first nail that is the printing target. After the printing for the first nail has been finished, the printing controller controls to start printing on the printing area in the second nail from the printing start position Sp set at the end on the side closer to the printing end position Ep of the printing area in the first nail, among the nail tip-side end and the root-side end of the printing area in the second nail that is the next printing target.

Therefore, printing can be efficiently started on the printing area of the next nail T after the printing of the printing area in the first nail is completed. Thus, it is possible to achieve rapid printing processing with as little waiting time as possible for the user, even when nail print is applied to the nails T of multiple fingers.

In the embodiment, the printing start position Sp of the printing area in the second nail is set at the end on the side that has the coordinate Na, Nb in the length direction (Y-axis direction in FIG. 3, FIG. 6, etc.) of the nail T closer to the coordinate Na, Nb in the length direction (Y-axis direction) of the nail T of the printing end position Ep in the printing area of the first nail, among the nail tip-side end and the root-side end of the printing area in the second nail.

In this way, in the embodiment, the position in the Y-axis direction of the printing end position Ep of the printing area in the first nail is compared with the coordinates of the ends in the Y-axis direction of the printing area of the nail T to be printed next, and the printing start position Sp is set at the end on the side having the shorter movement distance. Thus, the nail to be printed next can be accessed quickly, and printing can be completed efficiently for the printing area of nail T of multiple printing fingers U.

In the embodiment, the nail information obtainer 313 obtains the coordinates Na, Nb in the length direction of nail T of the nail tip-side end and the root-side end of the printing area in the second nail, and compares the coordinates Na2, Nb2 of the nail tip-side end and the root-side end with the coordinate Na1, Nb1 of the printing end position Ep in the printing area in the first nail. Then, the printing controller 315 determines the printing start position Sp for the printing area in the second nail based on this comparison result.

Therefore, the process of determining the printing start position Sp of the printing area in the second nail can be performed within the nail printing device 1, and smooth printing operation can be performed by the nail printing device 1 alone, for example, without cooperation with external devices such as various terminal devices and external servers.

In the embodiment, the printing start position Sp is set alternately at the nail tip-side end and the root-side end of the printing area in the order in which the printing finger U is placed.

As shown in FIG. 6, a general human finger arrangement is often an overall gently arcing arrangement pattern with a relatively long middle finger and a relatively short little finger and thumb. Therefore, it is possible to shorten the movement distance of the print head 41 in the sub-scanning direction when moving from the nail T of one printing finger U to the nail T of the printing finger U to be printed next by alternately moving up and down in the nail length direction (Y-axis direction). By setting the printing start position Sp according to the arrangement pattern that applies to many people, it is possible to perform the most rapid and smooth printing processing in many cases.

By setting such a pattern as the default, the process of setting the printing start position Sp can be simplified.

In the embodiment, whether to set the printing start position Sp at the nail tip-side end or the root-side end of the printing area is specified in advance according to the combination of multiple fingers placed in the device.

In other words, by storing multiple combination patterns as a table in advance in such a way, it is only necessary to select one of the patterns when setting the printing start position Sp, and the process of setting the printing start position Sp can be simplified.

The multiple patterns may be prioritized based on data about the arrangement of human fingers or other factors. A photographing unit (camera unit) or the like that can take a bird's-eye view of the arrangement of the user's printing fingers U placed on the finger stage 6 may be provided, so that the pattern closest to the arrangement pattern of the user's printing finger U obtained by this can be selected. In this case, it is possible to perform a more appropriate setting process of the printing start position Sp that reflects the user's unique characteristics.

In the embodiment, whether to set the printing start position Sp at the nail tip-side end or the root-side end of the printing area is specified in advance according to the length of the printing finger U.

If the length of the printing finger U is known, the outline shape, etc. of the nail T can be estimated to some extent without obtaining in detail the nail tip-side end and root-side end of the printing area of the nail T for each printing finger U, and it is possible to set the printing start position Sp simply and appropriately.

In addition, there is a certain degree of correspondence between finger type and length, for example, when the little finger is about this length, the middle finger is about this length. For this reason, for example, the coordinates of the nail tip-side end and root-side end of the printing area can be detected for the nail of first printing finger U such as the little finger or index finger, and for other fingers, the lengths, etc. may be estimated. For this reason, it is possible to set the printing start position Sp for each printing finger U simply and appropriately by preparing a table that associates the length of the printing finger U with the setting position of the printing start position Sp.

In the embodiment, the nail information obtainer 313 as the nail outline obtainer that obtains the outline shape of the nail T is provided, and the nail tip-side end and the root-side end of the printing area in the second nail are identified from the outline shape of nail obtained by the nail information obtainer 313.

In this way, since the outline shape of nail T can be obtained by the nail printing device 1, printing processing can be performed simply, not via the external devices.

In the embodiment, the nail information obtainer 313 as the nail outline obtainer obtains the outline shape of nail T by analyzing the nail image.

By using image analysis in this way, the shape of the nail T can be identified more simply and accurately than when using sensors, for example. Thus, it is possible to set the printing start position Sp simply and appropriately based on the outline shape of the nail T, and to print appropriately in the range to be printed.

In the embodiment, the nail image of the second nail is obtained before starting printing on the printing area in the second nail after the printing for the first nail has been finished.

In this way, the nail image is photographed before printing on the printing area in the second nail, so that even if the printing finger U moves until this photographing, the photographing and the setting of the printing area identified by the photographed nail image are not affected.

This allows for proper printing processing without giving the user the pain of not being able to move the printing finger U for a long time.

Though the embodiment of the present invention have been described above, the present invention is not limited to the embodiment, and various modifications can be made within the scope of the present invention.

For example, in the embodiment, the description has been made for the case of determining the printing start position Sp of the printing area for the nail T (second nail) to be printed next (i. e. whether to set the sub-scanning direction for printing to downward from the nail tip-side to the root-side or to upward from the root-side to the nail tip-side) from the positional relationship between the printing end position Ep of the printing area for the nail T (first nail) which has been printed and the printing area of the nail T (second nail) to be printed next. However, the way to set the printing start position Sp is not limited to this.

For example, the printing start position Sp (i.e., whether to set the sub-scanning direction for printing to downward from the nail tip-side to the root-side or upward from the root-side to the nail tip-side) may be determined from the nozzle position at the end of printing on the printing area of the printed nail T (first nail) and the nozzle position at the start of printing on the printing area of the nail T (second nail) to be printed next.

In other words, the coordinate of the printing end position Ep may be estimated from the nozzle position at the end of printing on the printing area of the printed nail T (first nail) and the nozzle position at the start of printing on the printing area of the nail T (second nail) to be printed next, and which of the coordinates of the nail tip-side end and root-side end of the printing area of nail T (second nail) to be printed next is close to the coordinate of the printing end position Ep may be determined to decide the printing start position Sp.

Figure 16:
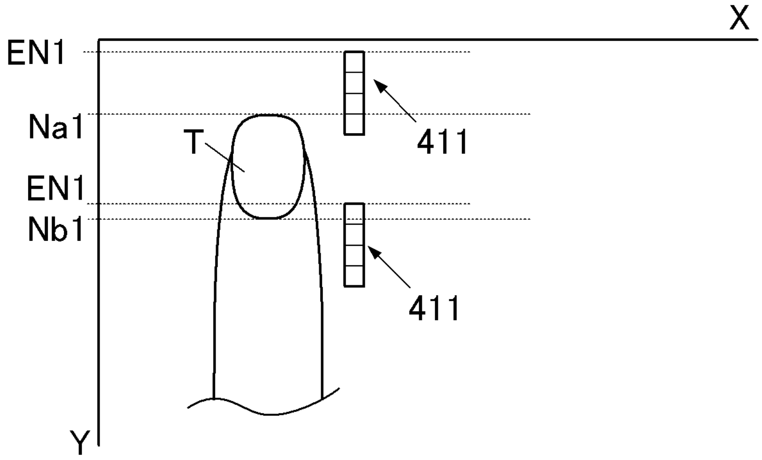
FIG. 16 is an explanation view for explaining amethod to determine the sub-scanning direction when printing for multiple printing fingers according to the nozzle arrangement of the print head.

For example, FIG. 16 shows an example of the stop position of the nozzles (nozzle row 411) at the end of printing when printing was performed from top to bottom (nail tip-side to root-side) in the sub-scanning direction (Y-axis direction in FIG. 16) for the printing area (which in the example shown in FIG. 16 matches the outline shape of nail T) of the nail T of a certain printing finger (the first nail, e.g., printing finger Ua, which is the little finger).

The print head 41 includes nozzle row 411 in which multiple nozzles are arranged in a row on the ink ejection surface, which is not shown in the drawing, and ink is ejected from the nozzle row 411 as appropriate to print.

In FIG. 16, the nail tip-side end of nail T that is the printing area is shown as the coordinate Na1, and the root-side end is shown as the coordinate Nb1.

The coordinate in the Y-axis direction of the tip of the nozzle row 411 at the stop position of the print head is EN1. In FIG. 16, the coordinate of the tip of the nozzle row 411 in the Y-axis direction at the stop position at the end of printing when printing from bottom to top (from the root-side to the nail tip-side) is (EN1). In either case, the print head stops with a portion of the nozzle row 411 overlapping the printing area in the Y-axis direction by the amount of printing performed in the last scan.

Figure 17:
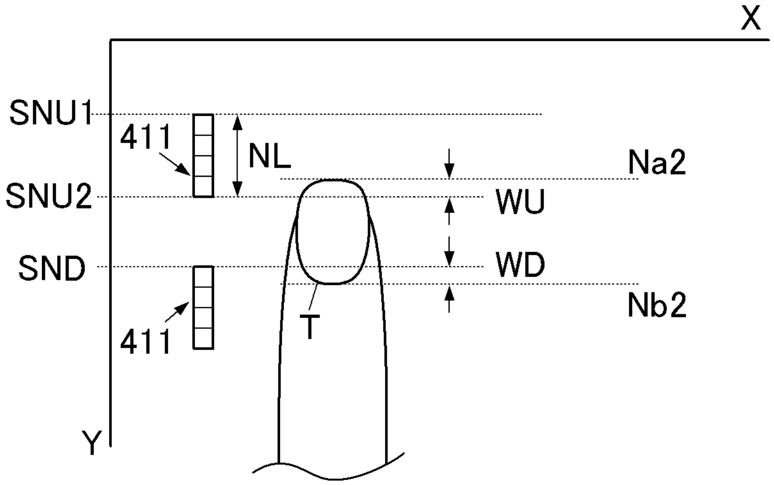
FIG. 17 is an explanation view for explaining amethod to determine the sub-scanning direction when printing for multiple printing fingers according to the nozzle arrangement of the print head.

Next, FIG. 17 shows the position of nozzle row 411 in the case where printing is performed from top to bottom (from the nail tip-side to the root-side) in the sub-scanning direction (Y-axis direction in FIG. 17) for the printing area of nail T (the second nail, e.g., printing finger Ub, which is the ring finger) of the printing finger to be printed next (matching the outline shape of nail T in the example shown in FIG. 17), and shows the position of the nozzle row 411 in the case of printing from bottom to top (from the root-side to the nail tip-side).

The print head illustrated in FIG. 16 and FIG. 17 performs so-called singling printing of filling the entire printing area with multiple scans while shifting the position so that a portion of the edge of the nozzle row 411 overlaps. In actual singling printing, there are used nozzles that actually eject ink and unused nozzles that do not eject ink, in the nozzle row 411. The explanation here is made on the assumption of the used nozzles.

For example, when printing from top to bottom (from the nail tip-side to the root-side), the rear end SNU2 of the nozzle row 411 is located at a position down, by the amount of WU, from the upper side of nail T, which is the printing area (i.e., the nail tip-side end, which is coordinate Na2). In this case, the tip of the nozzle row 411 is shown as SNU1. In this case, the print width WU is printed in the first scan.

On the other hand, when printing from the bottom to the top (from the root-side to the nail tip-side), the tip position SND of the nozzle row 411 is located at a position up, by the amount of WD, from the bottom side of the nail T, which is the printing area (i.e., the root-side end at the coordinate Nb2). In this case, the print width WD is printed in the first scan.

The first print width WU for printing from top to bottom and the first print width WD for printing from bottom to top often have the same value.

The outline coordinate of nail T, the values of print width WU and print width WD, and the length NL of nozzle row 411 are all grasped by the device. Thus, the values of SNU1 and SND can be obtained by calculation.

Thus, the distance (interval) between the tip position SND of nozzle row 411 when printing from bottom to top (from the root-side to nail tip-side) for the second nail (e.g., printing finger Ub, which is the ring finger) and the position (coordinate EN1) of the tip of the nozzle row 411 in the Y-axis direction at the stop position of the print head when printing is performed on the printing area in the first nail (e.g., printing finger Ua, which is the little finger) is compared with the distance (interval) between the tip position SNU1 of nozzle row 411 when printing from top to bottom (from the nail tip-side to the root-side) and the coordinate EN1. When the coordinate EN1 is close to the tip position SNU1, printing is performed from top to bottom (from the nail tip-side to the root-side) for the second nail, and when the coordinate EN1 is close to the tip position SND, printing is performed from bottom to top (from the root-side to the nail tip-side) for the second nail.

Even in the case where printing is performed from bottom to top (from root-side to tip-side) for the first nail and the tip of the nozzle row 411 at the stop position at the end of printing is at the coordinate (EN1) in the Y-axis direction, by using the same calculation as above, it is possible to calculate which of printing from upper position or from lower position for the second nail has a shorter distance (interval) to the coordinate (EN1).

In this way, in the case where the printing start position Sp in the printing area of nail T of the printing finger U to be printed next is determined by the position of the nozzle row 411 during printing, it is possible to move the print head 41 by selecting an efficient moving route with higher accuracy.

Thus, the time required for nail printing may be shorter, and it is expected to lighten the burden on the user by achieving rapid printing processing.

The embodiment illustrates, as the method for determining the printing start position Sp, various methods such as the method of determining, by the controller 31, which of the coordinate Na2 of the nail tip-side end and Nb2 of the root-side end of nail T in the printing area of nail T of the printing finger U to be printed next is closer to the printing end position Ep of the first nail, the method of setting the printing start position Sp alternately at the nail tip-side end and the root-side end in the order of finger placement, the method of specifying in advance whether to set the printing start position Sp at the nail tip-side end or the root-side end for each printing finger U depending on the combination of finger types and the lengths of the user's fingers (i.e., the method of preparing tables, etc.), and the method of estimating the coordinate of the side close to the printing end position Ep by the nozzle position. However, these methods do not exclude each other.

For example, a single device can be configured to implement all or some of these methods, and the user can select the desired method among them. The optimal method (mode) may be selected by the device. There are no restrictions on what makes the device to determine the method (mode) optimal when the optimal mode is selected and applied by the device. For example, the controller may decide which method is optimal to apply based on the user's nail information obtained by the nail information obtainer 313 to identify the printing area.

The embodiment illustrates a case where the nail printing device 1 which is the printing device includes the nail information obtainer 313 and the printing data generator 314, and the printing controller 315 determines the printing start position Sp to start printing on the printing area. However, it is not necessary for the control device 30 of the nail printing device 1 to have these functions.

For example, an external device, such as a mobile terminal device such as a smartphone, may be linked to the nail printing device 1, and the external device may perform the functions of the nail information obtainer 313 and the printing data generator 314 and functions other than causing the printing unit 40 to perform printing processing.

In this case, the nail printing device 1 operates the printing unit 40 to print on the printing area based on the printing data generated by the external device from the printing start position Sp set and instructed by the external device.

With this configuration, the burden on the control device 30 of the nail printing device 1 can be reduced, and the memory capacity of the storage 32 can be reduced because it is not necessary to have data, etc. required for processing. In addition, by delegating various processing to external devices, high-precision processing can be performed quickly.

This makes it possible to execute quick and high-definition nail printing with a simple configuration.

Although several embodiments of the present invention have been described above, the scope of the present invention is not limited to the embodiments described above, and the scope of the invention includes the scope described in the claims and the equivalent scope thereof.

There is an industrial applicability in the field of printing device that executes nail printing.

The invention claimed is:

1. An inkjet type printing device comprising:

a finger stage for placing a first finger and a second finger side by side, each of the first finger and the second finger being a finger or a toe;

a print head which performs printing on a nail of the first finger placed on the finger stage and next performs printing on a nail of the second finger placed on the finger stage;

a mover which moves the print head; and a processor which controls the print head and the mover to perform printing on the nail of the first finger shifting a main scanning direction in a sub-scanning direction from a printing start position which is set on the nail of the first finger, and which, when starting the printing on a printing area which is set in the nail of the second finger by moving the print head from a position corresponding to an arrangement position of the first finger to a position corresponding to an arrangement position of the second finger by the mover after the printing on the nail of the first finger is finished, sets a printing shift start position in the sub-scanning direction of the main scanning direction on a side closer to a printing end position on the nail of the first finger among a tip side and a root side of the nail of the second finger in the printing area set in the nail of the second finger.

2. The inkjet type printing device according to claim 1, wherein on the finger stage, a third finger is placed side by side with the second finger such that the second finger is positioned between the first finger and the third finger, the third finger being a finger or a toe, and after the printing on the nail of the second finger is finished, in starting printing on a printing area which is set in a nail of the third finger by moving the print head from the position corresponding to the arrangement position of the second finger to a position corresponding to an arrangement position of the third finger by the mover, the processor sets a shift start position in the sub-scanning direction of the main scanning direction on a side closer to a printing end position on the nail of the second finger among a tip side and a root side of the nail of the third finger in the printing area set in the nail of the third finger.

3. The inkjet type printing device according to claim 1, further comprising a camera which photographs the first finger and the second finger placed on the finger stage, wherein the processor sets a printing start position on the nail of the second finger based on an image of the first finger and the second finger obtained by photographing with the camera.

4. The inkjet type printing device according to claim 1, wherein the print head includes multiple nozzles which eject ink, and a printing start position on the printing area set in the nail of the second finger is determined based on a position of the nozzles at end of the printing on the nail of the first finger.

5. An inkjet type printing method comprising:

first printing which is performing, with a print head, printing on a nail of a first finger which is placed on a finger stage side by side with a second finger, while shifting a main scanning direction in a sub-scanning direction from a printing start position set in the nail of the first finger, each of the first finger and the second finger being a finger or a toe;

start position setting which is, when starting printing on a printing area which is set in a nail of the second finger by moving the print head from a position corresponding to an arrangement position of the first finger to a position corresponding to an arrangement position of the second finger after the first printing is finished, setting a shift start position in the sub-scanning direction of the main scanning direction on a side closer to a printing end position on the nail of the first finger among a tip side and a root side of the nail of the second finger in a printing area which is set in the nail of the second finger; and second printing which is starting the printing on the printing area set in the nail of the second finger from the shift start position which is set in the start position setting.

6. A non-transitory computer-readable storage medium storing a program, the program causing a computer of an inkjet type printing device to perform:

first printing which is performing, with a print head, printing on a nail of a first finger which is placed on a finger stage side by side with a second finger, while shifting a main scanning direction in a sub-scanning direction from a printing start position set in the nail of the first finger, each of the first finger and the second finger being a finger or a toe;

start position setting which is, when starting printing on a printing area which is set in a nail of the second finger by moving the print head from a position corresponding to an arrangement position of the first finger to a position corresponding to an arrangement position of the second finger after the printing by the first printing is finished, setting a printing shift start position in the sub-scanning direction of the main scanning direction on a side closer to a printing end position on the nail of the first finger among a tip side and a root side of the nail of the second finger in a printing area set in the nail of the second finger; and second printing which is starting the printing on the printing area set in the nail of the second finger from the shift start position which is set by the start position setting.

7. The inkjet type printing device according to claim 1, wherein the sub-scanning direction is set to be a direction along a length direction of the first finger or the second finger placed on the finger stage.

* * * * *